United States Patent
Umekawa et al.

(10) Patent No.: US 9,690,034 B2
(45) Date of Patent: Jun. 27, 2017

(54) ILLUMINATION DEVICE AND DISPLAY DEVICE

(71) Applicant: Sharp Kabushiki Kaisha, Osaka-shi, Osaka (JP)

(72) Inventors: Ichiro Umekawa, Osaka (JP); Hirofumi Oosawa, Osaka (JP); Takeshi Ishida, Osaka (JP); Ryuzo Yuki, Osaka (JP); Masaki Kageyama, Osaka (JP); Shugo Yagi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 221 days.

(21) Appl. No.: 14/414,511

(22) PCT Filed: Jul. 23, 2013

(86) PCT No.: PCT/JP2013/069926
§ 371 (c)(1),
(2) Date: Jan. 13, 2015

(87) PCT Pub. No.: WO2014/017490
PCT Pub. Date: Jan. 30, 2014

(65) Prior Publication Data
US 2015/0168631 A1 Jun. 18, 2015

(30) Foreign Application Priority Data
Jul. 23, 2012 (JP) .................. 2012-162620

(51) Int. Cl.
*F21V 7/04* (2006.01)
*F21V 8/00* (2006.01)

(52) U.S. Cl.
CPC ......... *G02B 6/0038* (2013.01); *G02B 6/0016* (2013.01); *G02B 6/0053* (2013.01);
(Continued)

(58) Field of Classification Search
CPC ... G02B 6/0038; G02B 6/0073; G02B 6/0016
(Continued)

(56) References Cited

U.S. PATENT DOCUMENTS 7,431,491 B2 * 10/2008 Liao ............... G02B 6/0038
362/337
7,697,813 B2 * 4/2010 Lee ............... G02B 6/0038
362/615
(Continued)

FOREIGN PATENT DOCUMENTS

JP 2002-169034 A 6/2002
JP 2005-063912 A 3/2005
(Continued)

OTHER PUBLICATIONS

Official Communication issued in International Patent Application No. PCT/JP2013/069926, mailed on Oct. 8, 2013.

*Primary Examiner* — Peggy Neils
*Assistant Examiner* — William N Harris
(74) *Attorney, Agent, or Firm* — Keating & Bennett, LLP

(57) ABSTRACT

An illumination device (10) is provided with the following: light sources (11); a light-guide member (12 (13)) that includes a light entry region (Is) and a light exit region (Os) which emits planar light; light entry portions (13*a*) that are formed in the light entry region (Is) and that oppose the light sources (11); and bright line suppression portions (20) that are formed in the areas between the light entry portions (13*a*) at the front side of the light entry region (Is), and that include bright line suppression prisms (21) which have a shape that changes the angle of the light emitted in a direction spreading out from the light sources (11) to a direction closer to the optical axes.

20 Claims, 24 Drawing Sheets

(52) U.S. Cl.
CPC ......... *G02B 6/0055* (2013.01); *G02B 6/0073* (2013.01); *G02B 6/0068* (2013.01)

(58) Field of Classification Search
USPC .................................................. 362/613, 620
See application file for complete search history.

(56) References Cited

U.S. PATENT DOCUMENTS

| | | | |
|---|---|---|---|
| 2004/0130883 A1* | 7/2004 | Leu ...................... | G02B 6/0061 362/624 |
| 2006/0082884 A1* | 4/2006 | Feng .................... | G02B 5/1814 359/569 |
| 2010/0277947 A1* | 11/2010 | Nagata ................. | G02B 6/0036 362/606 |
| 2012/0127399 A1 | 5/2012 | Shiraishi et al. | |
| 2013/0057807 A1* | 3/2013 | Goto .................... | G02B 6/0038 349/65 |

FOREIGN PATENT DOCUMENTS

| | | | | |
|---|---|---|---|---|
| JP | WO 2011151942 A1 * | 12/2011 | ........... | G02B 6/0038 |
| JP | 2012-113859 A | 6/2012 | | |

\* cited by examiner

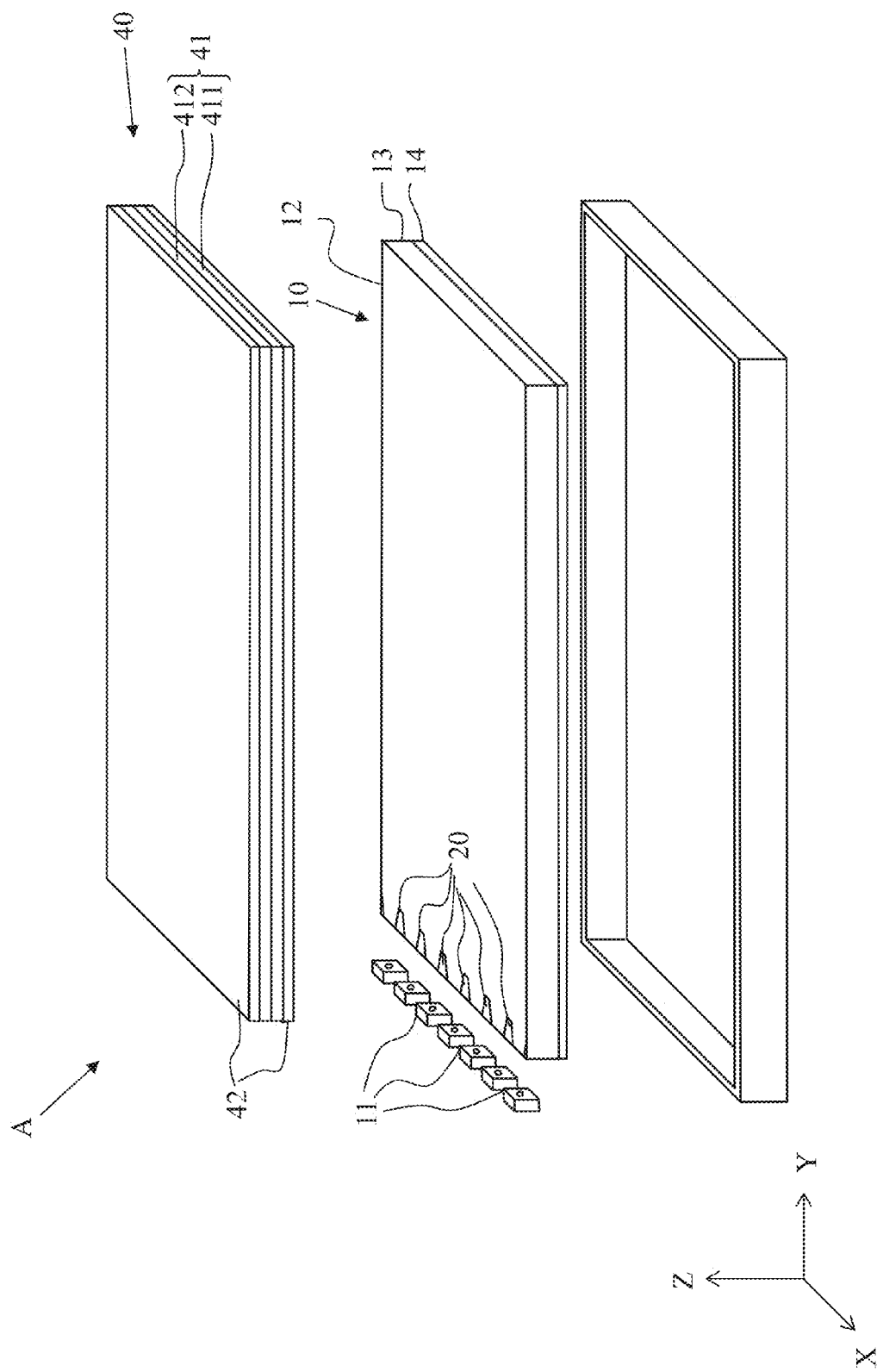

ILLUMINATION DEVICE AND DISPLAY DEVICE

TECHNICAL FIELD

The present invention relates to an illumination device employing a light guide member for guiding light, and relates to a display device provided with such an illumination device.

BACKGROUND ART

A liquid crystal display device (display device) incorporating a non-luminous liquid crystal panel (display panel) typically also incorporates a backlight unit (illumination device) which supplies light to the liquid crystal panel. The backlight unit is so structured as to output planar light with even luminance over the entire area of the planar liquid crystal panel. Some such backlight units are provided with a light guide plate (light guide member) to diffuse the light from the light source widely, thereby to obtain even luminance.

As backlight units including a light guide plate as mentioned above, for example, edge-lit backlight units are known. In an edge-lit backlight unit, typically, a light source is arranged at a side face of the light guide plate. In a so structured backlight unit, the light emitted from the light source enters the light guide plate through a side face thereof. The light is then guided (diffused) inside the light guide plate, and is eventually output, as planar light, toward the liquid crystal panel.

Today, as light sources in backlight units, light-emitting diodes (LEDs) are increasingly used. Compared with conventionally used fluorescent lamps (such as cold-cathode fluorescent lamps), LEDs are themselves more compact, and operate on lower driving voltages; this helps simplify the driving circuit, and allows size and thickness reduction in backlight units. Also, LEDs consume less electric power than cold-cathode fluorescent lamps, and this helps reduce energy consumption (power consumption).

On the other hand, in an edge-lit backlight unit, using a point light source such as an LED as mentioned above often makes it difficult to shine light into the light guide plate evenly over its dimension. This tends to result in, in a backlight unit employing an LED as a light source as mentioned above, bright lines (V-shaped bright lines) with higher luminance appearing in the diffusion pattern of the LED, producing luminance unevenness in the planar light. To suppress such luminance unevenness, for example, JP-A-2002-169034 proposes an illumination device (light guide plate) that outputs even light even in combination with a point light source such as an LED.

JP-A-2002-169034 discloses an illumination device wherein a trapezoidal protrusion is provided in a light guide plate, at a position corresponding to a point light source, and a through hole with a symmetric shape, such as triangular or trapezoidal, is provided in the trapezoidal protrusion. In this illumination device, the light from the light source is reflected on the side faces of the trapezoidal protrusion and on the side faces of the through hole, and thereby the light that has entered the light guide plate is spread laterally. This permits emission of light (planar light) with even luminance.

LIST OF CITATIONS

Patent Literature

Patent Document 1: JP-A-2002-169034

SUMMARY OF THE INVENTION

Technical Problem

Inconveniently, however, with the illumination device disclosed in JP-A-2002-169034, luminance unevenness can be suppressed, but special, complicated shapes are involved and need to be formed accurately. This makes it difficult to manufacture the light guide plate, and leads to increased cost.

Moreover, in the illumination device disclosed in JP-A-2002-169034, the through hole is formed in the light guide plate (the trapezoidal protrusion), and much of the light emitted from the LED passes through the through hole; this inconveniently results in an increased Fresnel reflection loss. The increased loss of light means lower light use efficiency.

Moreover, even with the protrusion as mentioned above, since its slant faces are formed along the diffusion pattern of the light emitted from the LED, near the LED, the light emitted from the LED does not strike the slant faces. Thus, it is difficult to reduce V-shaped bright lines near the LED.

An object of the present invention is to provide an illumination device and a display device that, despite having a simple structure, can suppress luminance unevenness.

Means for Solving the Problem

To achieve the above object, according to the present invention, an illumination device is provided with: a plurality of light sources arranged in a row; a light guide member including a light entry region close to a side face through which light from the light sources enters and a light exit region abutting the light entry region, planar light emerging from the light exit region; a plurality of light entry portions formed in the light entry region, and facing the plurality of light sources respectively; and a bright line suppression portion formed in a front part of the light entry region between the plurality of light entry portions, and including a bright line suppression prism so shaped as to make the angle of light emitted from the light sources in a spreading direction closer to the optical axes of the light sources.

With this structure, it is possible to change the angle of, out of the light emitted from the light sources, the light spreading in the row direction of the light sources (in the lateral direction) toward the optical axes of the light sources. By changing the angle of the light spreading in the lateral direction from the light sources in this way, it is possible to suppress brightening of parts where the light emitted in the lateral direction overlaps (appearance of V-shaped bright lines).

Thus, it is possible to suppress parts with higher luminance, that is, luminance unevenness, in the planar light output from the illumination device. Moreover, the structure where the bright line suppression prisms have only to be formed on the front surface of the light guide member is not only simple but also suffers less from losses such as a Fresnel reflection loss, resulting in accordingly higher light use efficiency and achieving energy saving.

In the structure described above, the bright line suppression prism may be formed so as to be the wider in the row direction of the light sources the farther away from the light entry portions in the optical axis direction of the light sources.

In the structure described above, the bright line suppression prism may comprise a plurality of bright line suppression prisms, and the plurality of bright line suppression prisms may be arranged to abut one another with no gaps between them.

In the structure described above, the bright line suppression portion may be, as seen in a plan view, line-symmetric about a line parallel to the optical axes of the light sources, and the plurality of bright line suppression prisms may be arranged inside the bright line suppression portion, and be formed to be line-symmetric about the same line as the bright line suppression portion.

In the structure described above, the bright line suppression portion may be trapezoidal; the bright line suppression prism may be a concave prism with a triangular cross section.

In the structure described above, there may be further provided auxiliary prisms formed in a front part of the light entry region, where the bright line suppression prism is not formed, so as to extend in a direction parallel to the optical axes of the light sources, and arranged in the row direction of the light sources, so as to assist diffusion of light travelling inside the light entry region in the row direction of the plurality of light sources.

With this structure, the auxiliary prisms are formed in parts where V-shaped bright lines are likely to appear, resulting in an increased effect of suppressing appearance of V-shaped bright lines. Moreover, the auxiliary prisms are formed also in parts abutting the light sources. Thus, it is possible to suppress concentration of the light having its angle changed by the bright line suppression prisms around the optical axes of the light sources and hence higher luminance (appearance of bright lines) in those parts. Thus, the illumination device can output planar light with less luminance unevenness.

In the structure described above, the auxiliary prisms may comprise a first auxiliary prism arranged to abut the bright line suppression portion and a second auxiliary prism arranged to abut the light entry portion.

In the structure described above, the auxiliary prisms may be concave prisms with a triangular cross section.

In the structure described above, there may be further provided a plurality of diffusion prisms formed on the front face of the light guide member so as to extend parallel to the optical axes of the light sources, so as to diffuse light guided inside the light guide member in the row direction of the plurality of light sources, and the auxiliary prisms may be formed between the diffusion prisms.

Appliances adopting an illumination device according to the present invention include display devices provided with a display panel that receives light from the illumination device. Using a liquid crystal panel as the display panel makes it possible to obtain a liquid crystal display device as the display device.

Advantageous Effects of the Invention

According to the present invention, it is possible to provide an illumination device and a display device that, despite having a simple structure, can suppress luminance unevenness.

BRIEF DESCRIPTION OF DRAWINGS

FIG. 24 is an exploded perspective view of a liquid crystal display device as an example of a display device according to the present invention.

DESCRIPTION OF EMBODIMENTS

Embodiments of the present invention will be described below with reference to the accompanying drawings.

(First Embodiment)

Figure 1:
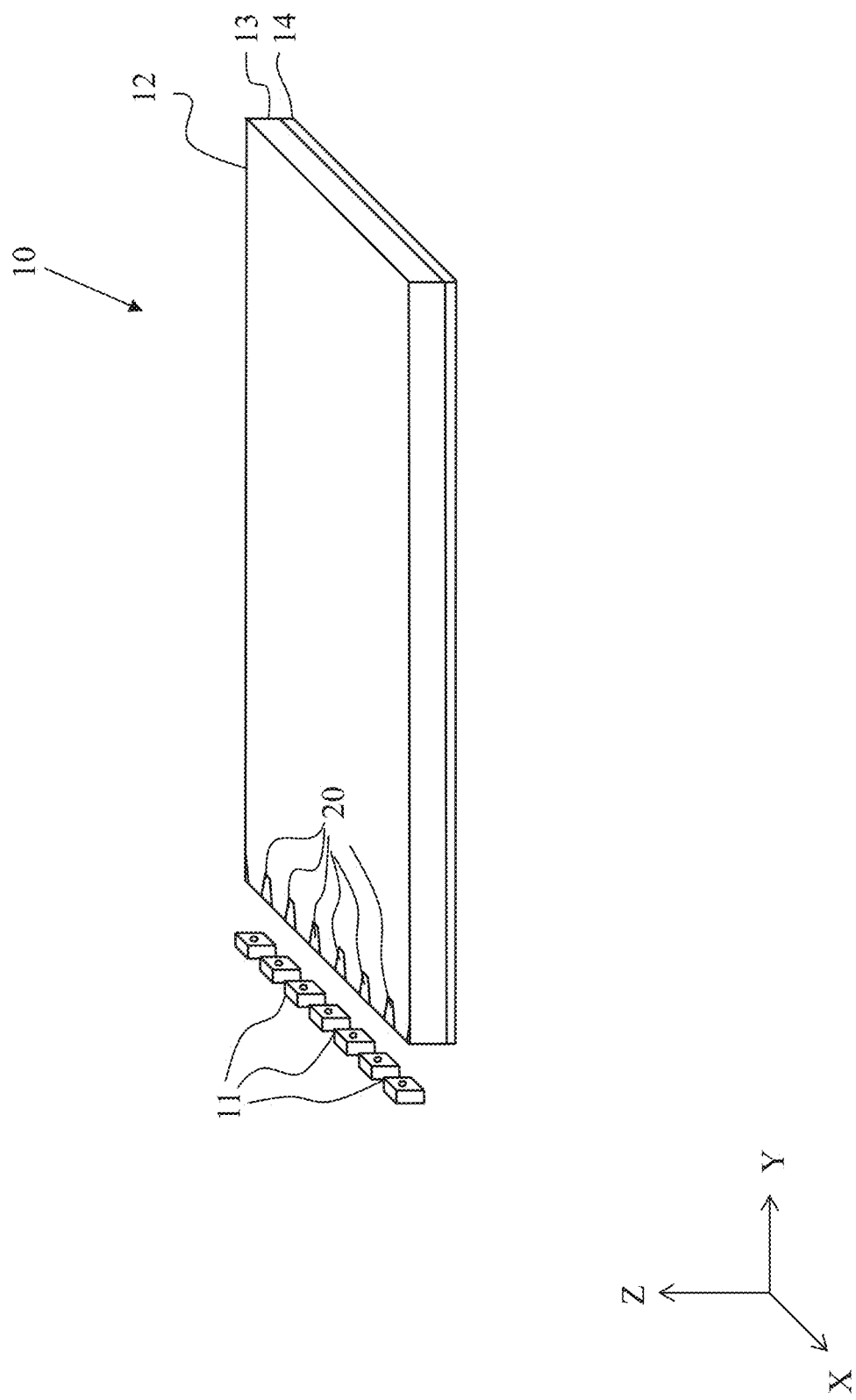
FIG. 1 is a perspective view schematically showing an example of a backlight unit as an illumination device according to the present invention.
Figure 2:
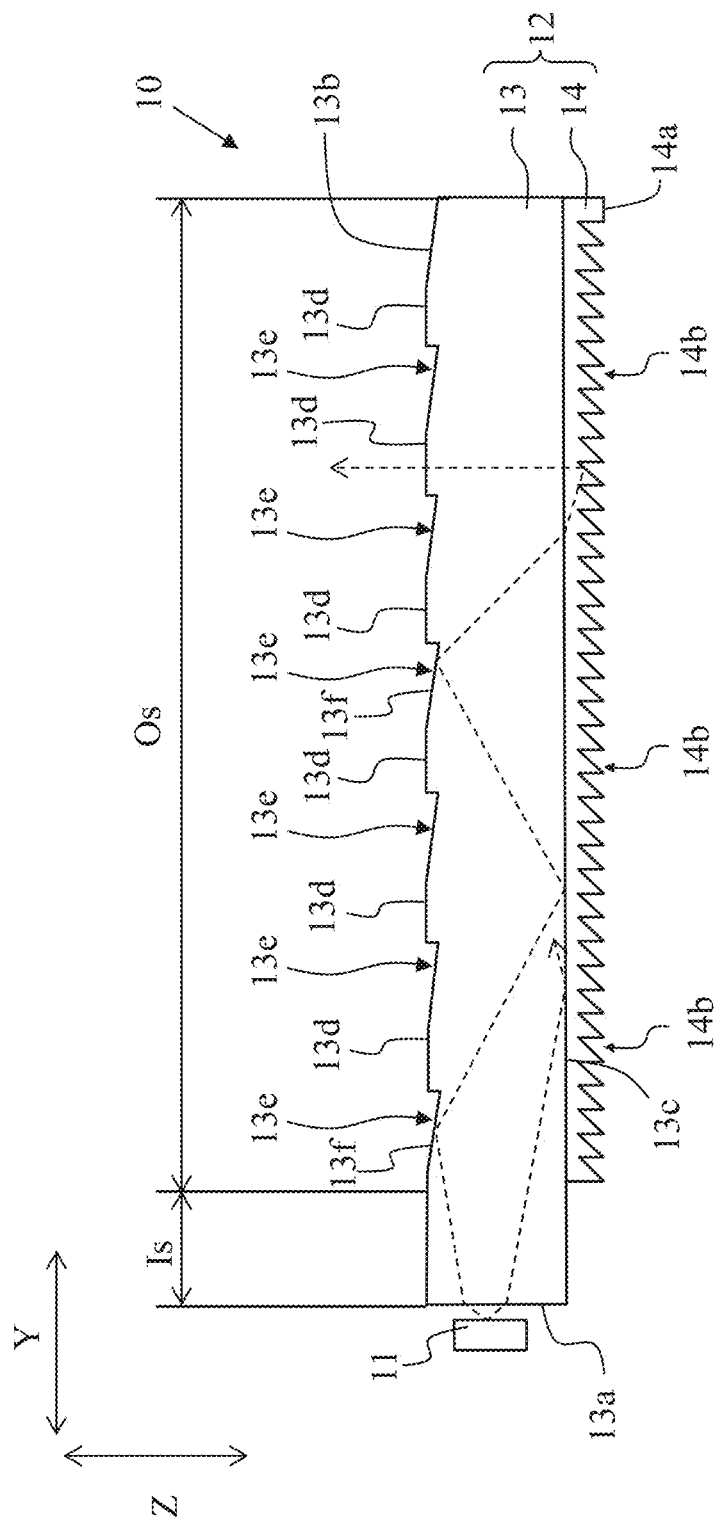
FIG. 2 is a side view of the backlight unit shown in FIG. 1.
Figure 3:
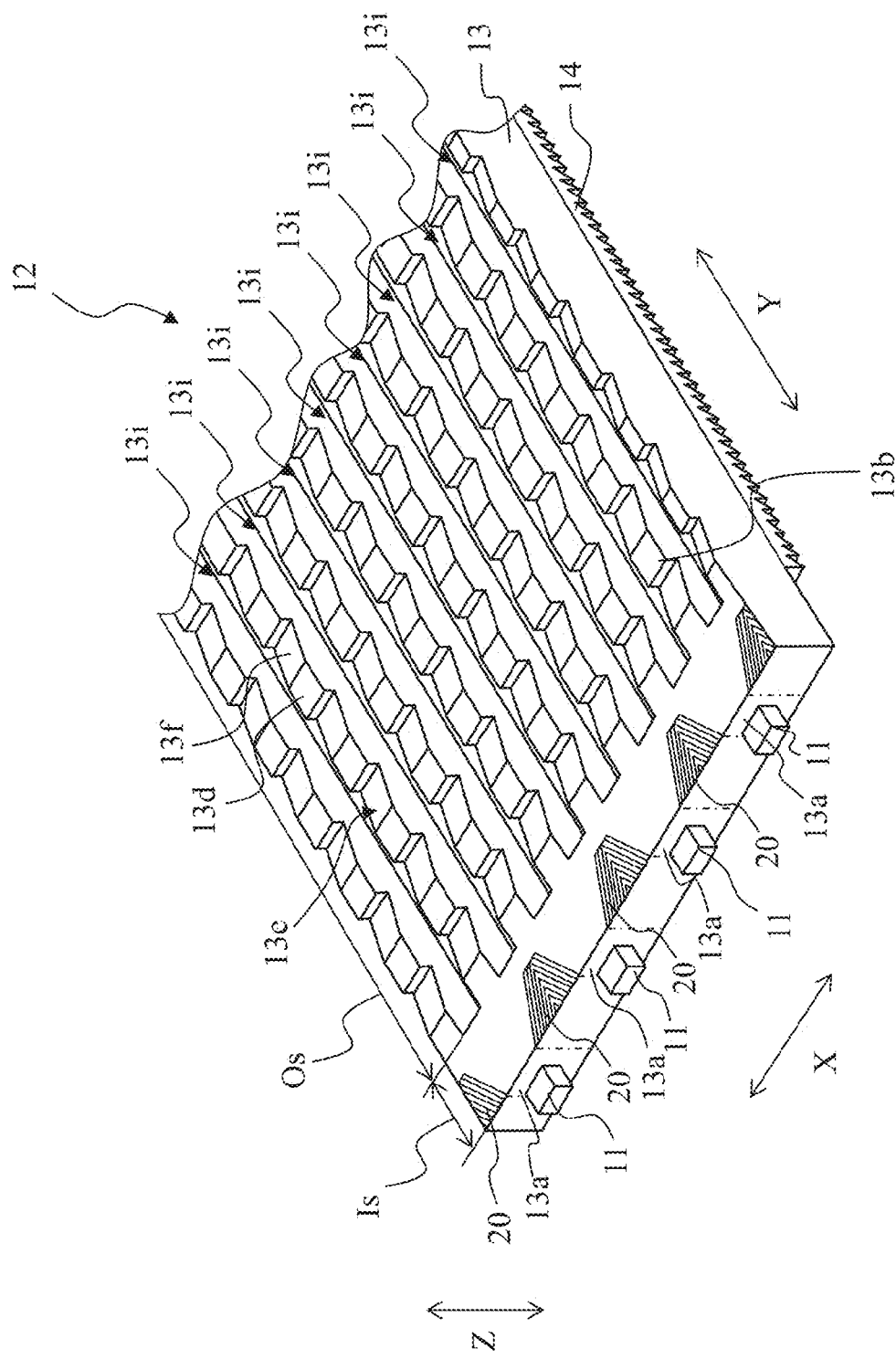
FIG. 3 is a schematic perspective view of a light guide plate used in the backlight unit shown in FIG. 2.
Figure 4:
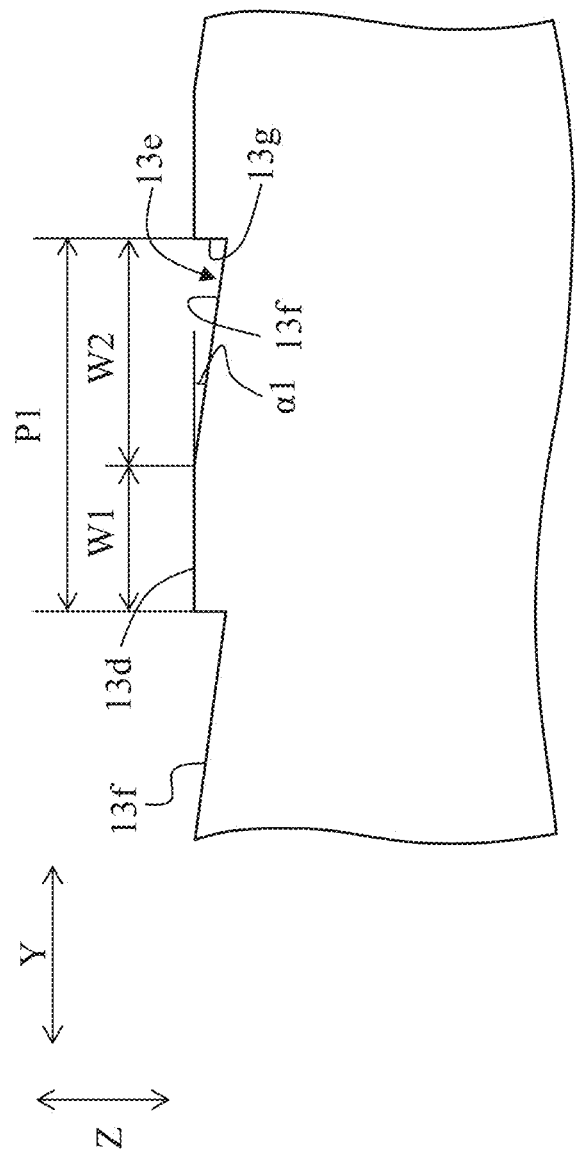
FIG. 4 is an enlarged sectional view of a light exit portion of the light guide plate shown in FIG. 3.
Figure 5:
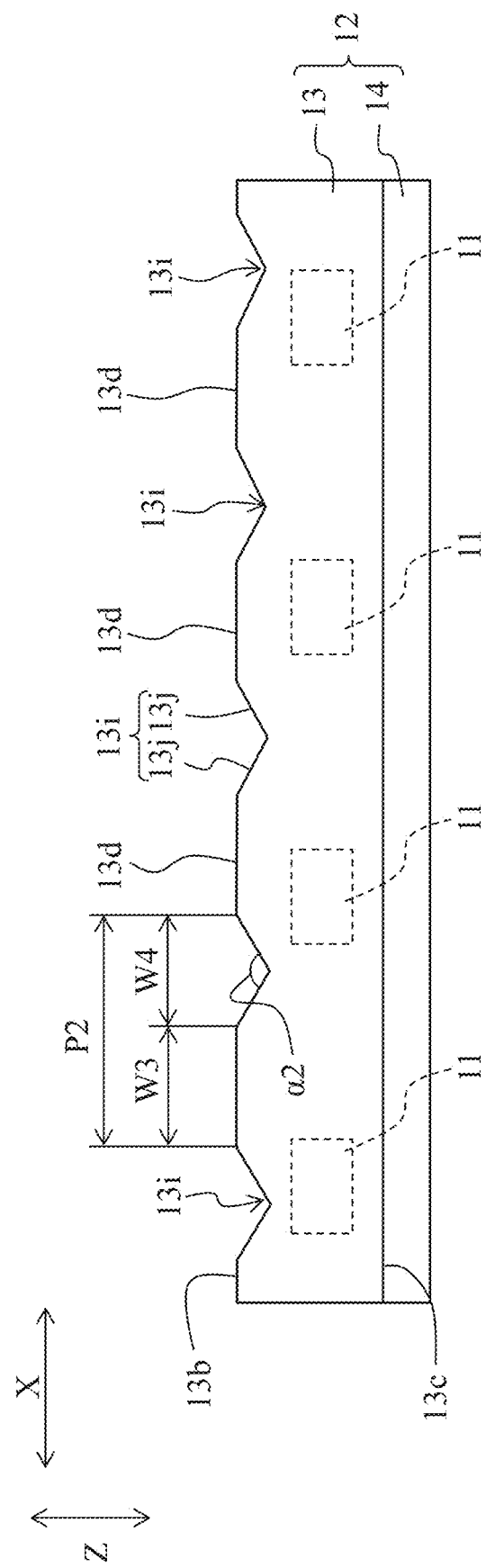
FIG. 5 is a sectional view of the light guide plate shown in FIG. 3.
Figure 6:
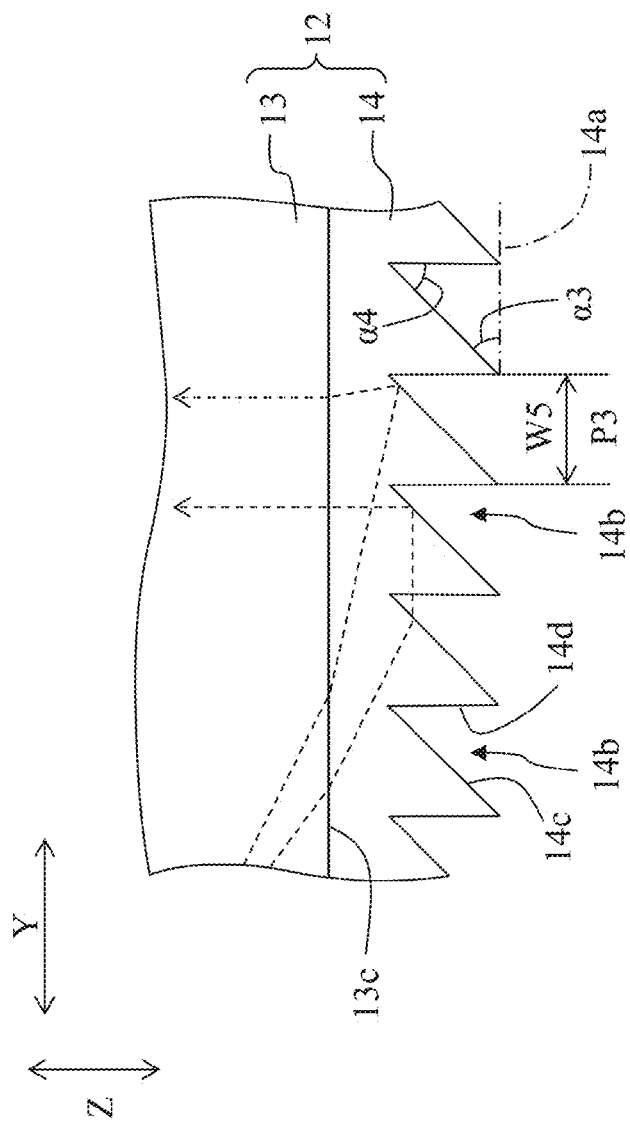
FIG. 6 is an enlarged sectional view of a rear part of the light guide plate shown in FIG. 3.

FIG. 1 is a perspective view schematically showing an example of a backlight unit as an illumination device according to the present invention. FIG. 2 is a side view of the backlight unit shown in FIG. 1. FIG. 3 is a schematic perspective view of a light guide plate used in the backlight unit shown in FIG. 2. FIG. 4 is an enlarged sectional view of a light exit portion of the light guide plate shown in FIG. 3. FIG. 5 is a sectional view of the light guide plate shown in FIG. 3. FIG. 6 is an enlarged sectional view of a rear part of the light guide plate shown in FIG. 3. First, the shape of a backlight unit according to the present invention will be described. In the following description, with respect to the backlight unit, the width direction will be referred to as the X direction, the longitudinal direction as the Y direction, and the thickness direction as the Z direction. In FIGS. 1 to 6 and other drawings, for the sake of simple description, prisms are often shown with shapes and dimensions different from those they actually have.

The backlight unit 10 is of an edge-lit type. As shown in FIGS. 1 and 2, the backlight unit 10 includes an LED 11 as a light source and a light guide plate 12 for guiding the light emitted from the LED 11. Actually, the backlight unit 10 includes a plurality of LEDs 11, and these LEDs 11 are arranged in a row extending in the width direction of the light guide plate 12 (that is, in the X direction; see FIG. 1).

The light guide plate 12 is a light-transmitting plate-form member. The light guide plate 12 includes a light guide body 13 and a low-refraction layer 14 having a lower index of refraction than the light guide body 13. As shown in FIG. 2, the light guide body 13 divides into a light entry region Is and a light exit region Os: the light from the LEDs 11 enters the light entry region Is and then the light exit region Os, where the light is diffused so that planer light with a substantially even or predetermined luminance distribution emerges from the light exit region Os.

As shown in FIG. 3, on that face of the light entry region Is of the light guide body 13 which faces the LEDs 11, a light entry portion 13a is formed through which the light from the LEDs 11 is shone in. On the front face of the light exit region Os of the light guide body 13, a light exit portion 13b is provided through which the light guided inside the light guide plate 12 is shone out as planar light. Although in FIG. 3 the light entry portion 13a is indicated by dash-and-dot lines for the sake of convenience, it need not be indicated on the actual light guide body 13.

The light guide body 13 is formed substantially in the shape of a rectangular parallelepiped, and actually a plurality of light entry portions 13a are provided one for each of the LEDs 11, the light entry portions 13a being arranged substantially parallel to the light exit faces of those LEDs 11. The light guide body 13 is so formed that the light exit portion 13b and the rear face 13c are substantially parallel to each other.

The light guide body 13 constituting the light guide plate 12 is formed of a light-transmitting resin material such as acrylic or polycarbonate. By forming the light guide body 13 from acrylic or the like, it is possible to give it an index of refraction of about 1.49. By forming the light guide body 13 from polycarbonate or the like, it is possible to give it an index of refraction of about 1.59. When formed from acrylic, the light guide body 13 has higher light transmittance than when formed from polycarbonate.

As shown in FIGS. 2 and 3, the low-refraction layer 14 lies in close contact with the rear face 13c of the light guide body 13, the light guide body 13 and the low-refraction layer 14 being integrally formed. The low-refraction layer 14 has a thickness of, for example, about 10 μm to about 50 μm.

The low-refraction layer 14 is formed from a light-transmitting resin material with a lower index of refraction than the light guide body 13. Examples of such resin materials include fluorine-containing acrylate and resin containing hollow particles such as a nano-size inorganic filler. By forming the low-refraction layer 14 from fluorine-containing acrylate or the like, it is possible to give it an index of refraction of about 1.35. By forming the low-refraction layer 14 from resin containing hollow particles such as a nano-size inorganic filler or the like, it is possible to give it an index of refraction of 1.30 or less.

Preferably, the index of refraction (n1) of the light guide body 13 is 1.42 or more, and more preferably in the range of 1.59 to 1.65. On the other hand, preferably, the index of refraction (n2) of the low-refraction layer 14 is less than 1.42, and more preferably in the range of 1.10 to 1.35. Preferably, the index of refraction (n1) of the light guide body 13 and the index of refraction (n2) of the low-refraction layer 14 satisfy the relationship n1/n2>1.18.

As shown in FIG. 2, in the light exit portion 13b of the light guide body 13, a plurality of light guide prisms 13e are formed which (so guide light as to) make the angle of incidence of the light from the LEDs 11 with respect to the rear face 13c the smaller the farther away from the LEDs 11. Specifically, in the light exit portion 13b of the light guide body 13, a plurality of flat portions 13d and a plurality of concave light guide prisms 13e are formed alternately along a direction normal to the light entry portion 13a of the light guide body 13 (that is, in the Y direction, which is the direction perpendicular to the X direction). That is, between the light guide prisms 13e neighboring in the Y direction, the flat portions 13d are formed. The flat portions 13d and the light guide prisms 13e are each formed so as to extend in the X direction (see FIG. 3).

The flat portions 13d are formed on the same plane as the light exit portion 13b, and are formed substantially parallel to the rear face 13c. As shown in FIG. 4, the flat portions 13d are formed so as to have a predetermined dimension W1 in the Y direction.

The concave light guide prisms 13e are composed of inclined faces 13f, which are inclined relative to the flat portions 13d, and vertical faces 13g, which are substantially perpendicular to the flat portions 13d. As shown in FIG. 4, the inclined faces 13f are formed so as to be the closer to the rear face 13c the farther away from the LEDs 11.

Thus, the light shone in through the light entry portion 13a is reflected repeatedly between the inclined faces 13f (light guide prisms 13e) and the rear face 13c of the light guide body 13, and meanwhile its angle of incidence with respect to the rear face 13c of the light guide body 13 decreases progressively. Preferably, the inclination angle α1 of the inclined faces 13f relative to the flat portions 13d is 5° or less, and more preferably in the range of 0.1° to 3.0°.

The light guide prisms 13e are formed so as to have a predetermined dimension W2 in the Y direction. Preferably, the dimension W2 of the light guide prisms 13e in the Y direction is 0.25 mm or less, and more preferably in the range of 0.01 mm to 0.10 mm. The light guide prisms 13e are arranged at a predetermined pitch P1 (=W1+W2) in the Y direction.

In the light guide body 13, the dimension W1 of the flat portions 13d in the Y direction, the inclination angle α1 of the inclined faces 13f, the dimension W2 of the inclined faces 13f (light guide prisms 13e) in the Y direction, and the pitch P1 of the inclined faces 13f (light guide prisms 13e) in the Y direction are fixed irrespective of the distance from the LEDs 11. However, these dimensions need not be fixed; they may instead be so set as to vary according to the distance from the LEDs 11 or to vary from one given range to another such that the angle of incidence of the light inside the light guide plate 12 relative to the rear face 13c decreases.

As shown in FIG. 5, in the light exit portion 13b of the light guide body 13, a plurality of concave diffusion prisms 13i extending along the Y direction are formed side by side at fixed intervals in the X direction. That is, between the diffusion prisms 13i neighboring in the X direction, the flat portions 13d are formed. The flat portions 13d are formed so as to have a predetermined dimension W3 in the X direction.

The diffusion prisms 13i have a pair of inclined faces 13j which are inclined relative to the flat portions 13d, and have a concave shape. Specifically, the diffusion prisms 13i are formed so as to have a triangular cross section. Preferably, the angle α2 formed by the pair of inclined faces 13j (the apical angle of the diffusion prisms 13i) is in the range of about 120° to about 140°. The diffusion prisms 13i need not have a triangular cross section; they may instead have, for example, a curved cross section, such as describing part of a circular or elliptical arc, or a polygonal cross section; they may have any of varying shapes that permit the light guided inside the light guide body 13 to be diffused in the lateral direction (X direction) such that the light emerging from the light exit portion 13b has even luminance.

The diffusion prisms 13i are formed so as to have a predetermined dimension W4 in the X direction. Preferably, the dimension W4 of the diffusion prisms 13i in the X direction is about 0.1 mm or less, and more preferably in the range of about 0.010 mm to about 0.030 mm. Preferably, the pitch P2 (=W3+W4) of the diffusion prisms 13i in the X direction satisfies P2≤W4×2. Preferably, the dimension W3 of the flat portions 13d in the X direction is equal to or smaller than the dimension W4 of the pair of inclined faces 13j in the X direction.

Preferably, the diffusion prisms 13i are formed in the same shape, in the same size, and at the same pitch irrespective of where they are formed on the plane of the light guide body 13. That is, the dimension W3 of the flat portions 13d in the X direction, the apical angle α2 of the diffusion prisms 13i, the dimension W4 of the diffusion prisms 13i in the X direction, and the pitch P2 of the diffusion prisms 13i in the X direction are fixed.

Back with reference to FIG. 3, the light guide body 13 will be described further. As shown in FIG. 3, in the light guide body 13, the light guide prisms 13e and the diffusion prisms 13i are formed so as to be on the same plane. The diffusion prisms 13i have the function of diffusing light in the lateral direction (X direction). Preferably, the proportion of the area occupied by the diffusion prisms 13i in the total front-view area of the light guide prisms 13e and the diffusion prisms 13i is 50% or more.

As shown in FIG. 6, on the rear face 14a of the low-refraction layer 14 (that is, on the rear face of the light guide plate 12), a plurality of concave rear prisms 14b are formed. The rear prisms 14b are formed so as to overlap at least the entire light exit region Os of the light guide plate 12. The rear prisms 14b are formed so as to extend in the X direction.

The rear prisms 14b are composed of inclined faces 14c, which are inclined relative to the rear face 14a, and vertical faces 14d, which are perpendicular to the rear face 14a. The inclined faces 14c are formed so as to be not curved but flat. The inclined faces 14c are formed so as to be the closer to the light guide body 13 the farther away from the LEDs 11. Here, preferably, the inclination angle α3 of the inclined faces 14c relative to the rear face 14a is in the range of about 40° to about 50°. That is, preferably, the angle α4 formed between the inclined faces 14c and the vertical faces 14d is in the range of about 40° to about 50°.

The rear prisms 14b are formed so as to have a predetermined dimension W5 in the Y direction. Preferably, the dimension W5 of the rear prisms 14b in the Y direction is about 0.1 mm or less, and more preferably in the range of about 0.010 mm to about 0.025 mm.

The rear prisms 14b are arranged at a pitch P3 equal to the dimension W5 in the Y direction. That is, the plurality of rear prisms 14b are arranged contiguously with no gaps in the Y direction, with no flat portions provided between the neighboring rear prisms 14b.

The rear prisms 14b may be formed in the same shape, in the same size, and at the same pitch over substantially the entire area of the rear face 14a of the low-refraction layer 14. So forming the rear prisms 14b helps suppress unevenness in light-condensing characteristics on the plane of the low-refraction layer 14. This helps make even the luminance of the planar light emerging from the light exit portion 13b. As will be described later, the rear prisms 14b have the function of totally reflecting the light from the LEDs 11 frontward at the interface between the light guide plate 12 and the air.

The light emitted from the LEDs 11 is reflected repeatedly between the light guide prisms 13e (light exit portion 13b) and the rear face 13c of the light guide body 13, and meanwhile its angle of incidence relative to the rear face 13c of the light guide body 13 decreases progressively. When the angle of incidence relative to the rear face 13c becomes smaller than the critical angle, the light enters the low-refraction layer 14.

Out of the light that has entered through the light entry portion 13a of the light guide body 13, the light traveling toward the rear face 13c of the light guide body 13 is likewise reflected repeatedly between the rear face 13c and the light guide prisms 13e (light exit portion 13b) of the light guide body 13 before entering the low-refraction layer 14.

Thereafter, as shown in FIG. 6, substantially all of the light that has entered the low-refraction layer 14 is, at the inclined faces 14c of the rear prisms 14b (at the interface between the inclined faces 14c of the rear prisms 14b and the air), either totally reflected frontward (see broken-line arrows), or first transmitted and then totally reflected (see broken-line arrows). The light totally reflected on (the inclined faces 14c of) the rear prisms 14b (see broken-line arrows) enters the light guide body 13 once again, and then emerges from the light exit portion 13b (see FIG. 2 etc.) frontward.

The index of refraction (n1) of the light guide body 13 is 1.42 or more (about 1.59 to about 1.65), and the index of refraction of air is about 1; thus, the critical angle between the light guide body 13 and the air is smaller than the critical angle between the light guide body 13 and the low-refraction layer 14. Consequently, almost no light emerges from the light exit portion 13b without passing through the rear prisms 14b of the low-refraction layer 14. That is, substantially all the light that has entered the light guide plate 12 (light guide body 13) through the light entry portion 13a first enters the low-refraction layer 14, is then reflected on the rear prisms 14b to travel back into the light guide body 13, and then emerges from the light exit portion 13b.

As shown in FIG. 5, since the diffusion prisms 13i are formed in the light exit portion 13b of the light guide body 13, part of the light that travels toward the light exit portion 13b of the light guide body 13 is diffused (reflected) to both sides in the X direction on the inclined faces 13j of the diffusion prisms 13i. Here, light with large angles of incidence with respect to the light exit portion 13b of the light guide body 13 as seen from the light entry portion 13a side of the light guide body 13 is reflected on the inclined faces 13j of the diffusion prisms 13i to come to have smaller angles of incidence with respect to the rear face 13c of the light guide body 13. That is, the light from the LEDs 11 is diffused in the X direction by the diffusion prisms 13i before entering the low-refraction layer 14.

As described above, owing to the provision, in the light exit portion 13b of the light guide body 13, of the plurality of light guide prisms 13e which progressively reduce the angle of incidence of the light from the LEDs 11 with respect to the rear face 13c of the light guide body 13, the light from the LEDs 11 is guided while being reflected repeatedly between the light exit portion 13b and the rear face 13c of the light guide body 13. Meanwhile, the angle of incidence of the light with respect to the rear face 13c of the light guide body 13 decreases progressively. When the angle of incidence with respect to the rear face 13c of the light guide body 13 becomes smaller than the critical angle between the light guide body 13 and the low-refraction layer 14, the light enters the low-refraction layer 14.

Thus, the light that enters the low-refraction layer 14 has a smaller spread angle in the Y direction, and likewise the light reflected at the interface between the rear face 14a of the low-refraction layer 14 and the air has a smaller spread angle in the Y direction. It is thus possible to improve light-condensing characteristics and to improve the luminance of the planar light. This eliminates the need to provide a plurality of, and some cases any, optical sheets, such as a condenser lens sheet, on the light guide plate 12.

In the backlight unit 10 provided with the LEDs 11 and the light guide plate 12, the LEDs 11 are point light sources, and the distance from the LEDs 11 to the light entry portion 13a of the light guide plate 12 is short; thus, a bright line in the shape of the letter V (V-shaped bright line) tends to appear in a region close to the light entry portion 13a of the light guide body 13 (near the light entry portion). Such a V-shaped bright line may degrade illumination quality in the region close to the light entry portion 13a.

Figure 7:
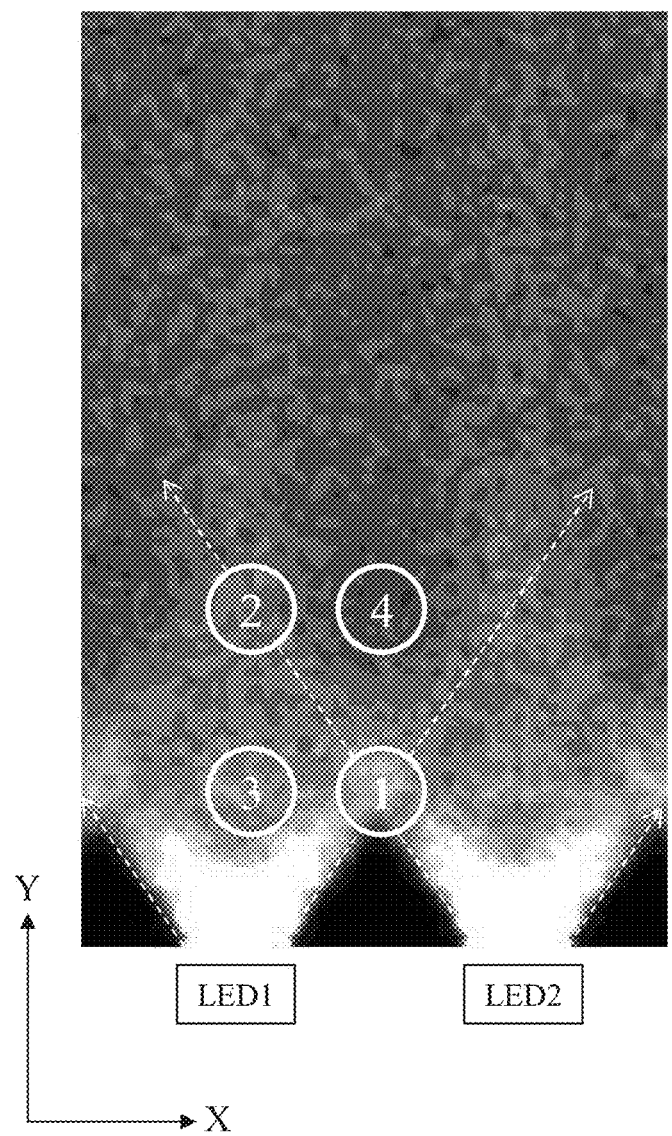
FIG. 7 is a diagram showing V-shaped bright lines appearing when a conventional light guide plate is used in combination with LEDs as light sources.

Now, with reference to the relevant drawings, a description will be given of the V-shaped bright line that appears near the light entry portion of the light guide plate 12. FIG. 7 is a diagram showing V-shaped bright lines that appear when a conventional light guide plate is used in combination with LEDs as light sources. When point light sources like the LEDs 11 are used as light sources, as shown in FIG. 7, V-shaped bright lines (see broken lines) tend to appear near the light entry portion 13a of the light guide plate 12. To find out the cause of the V-shaped bright line, the present inventors made diverse studies.

Figure 8:
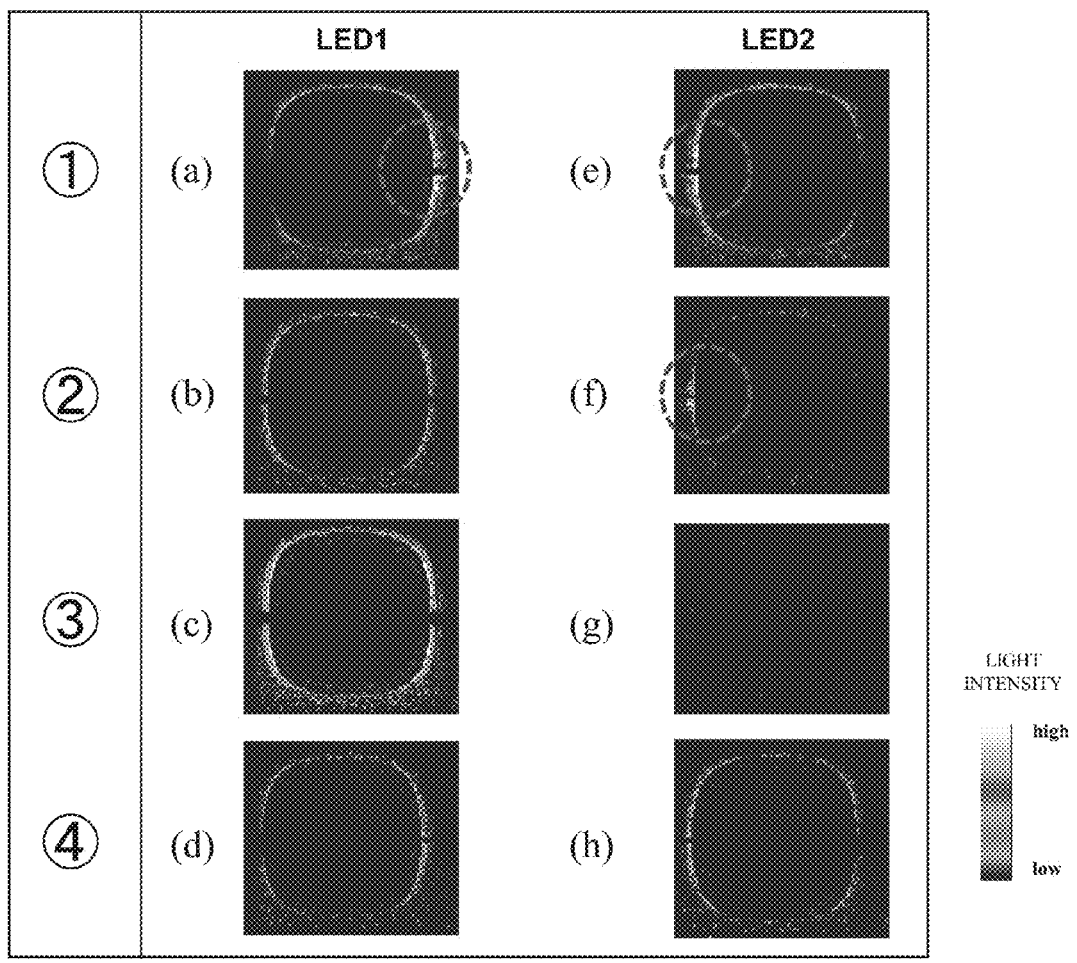
FIG. 8 is a diagram showing the angular distribution of light in different regions in FIG. 7.

First, through simulations, the inventors identified the angle, in the distribution of the light emitted from LEDs (light sources), at which the light affects the V-shaped bright line. The results are shown in FIG. 8. FIG. 8 is a diagram showing the angular distribution of light in different regions in FIG. 7. Region 1 is located in the V-shaped bright line portions of LED1 and LED2, and region 2 is located in the V-shaped bright line portion of LED2. On the other hand, region 3 and region 4 are located away from V-shaped bright lines. In FIG. 8, at (a) to (d) is shown the distribution of the light emitted from LED1, and at (e) to (h) is shown the distribution of the light emitted from LED2.

As will be seen from FIG. 8, in region 1, located in V-shaped bright line portions, both LED1 (FIG. 8(a)) and LED2 (FIG. 8(e)) exhibited high light intensity at lateral angles (the parts enclosed by broken lines), and the light there was observed as V-shaped bright lines. In region 2, located in the V-shaped bright line of LED2, LED2 (FIG. 8(f)) exhibited high light intensity at lateral angles (the part enclosed by a broken line). By contrast, in regions 3 and 4, located away from V-shaped bright lines, no high light intensity was observed, and substantially equal light intensity was observed at all angles in the angular distribution. Thus, it was observed that light that produced a V-shaped bright line concentrated in lateral parts (at lateral angles) of the circumference.

Thus, it was confirmed that a V-shaped bright line is ascribable to the angular distribution of the light shone in, and that light in lateral parts produces a V-shaped bright line. This is considered to result from light at lateral angles emerging frontward from the light exit portion 13b (see FIG. 5) in a region close to the light entry portion 13a. Specifically, under the influence of surface roughness of the light entry portion 13a of the light guide plate 12 and the light guide prisms 13e (see FIG. 2) and the diffusion prisms 13i (see FIG. 5) formed in the light exit portion 13b, in a region close to the light entry portion 13a, the angle of incidence of light with respect to the rear face 13c of the light guide body 13 is equal to or smaller than the critical angle between the light guide body 13 and the low-refraction layer 14.

Thus, the light enters the low-refraction layer 14, and is then reflected frontward on the rear prisms 14b (see FIG. 2). The light then emerges from the light exit portion 13b frontward. This light is considered to produce a V-shaped bright line in a region close to the light entry portion 13a. That is, the light that is not totally reflected at the interface with the low-refraction layer 14 is considered to leak forward to produce the V-shaped bright line.

Figure 9:
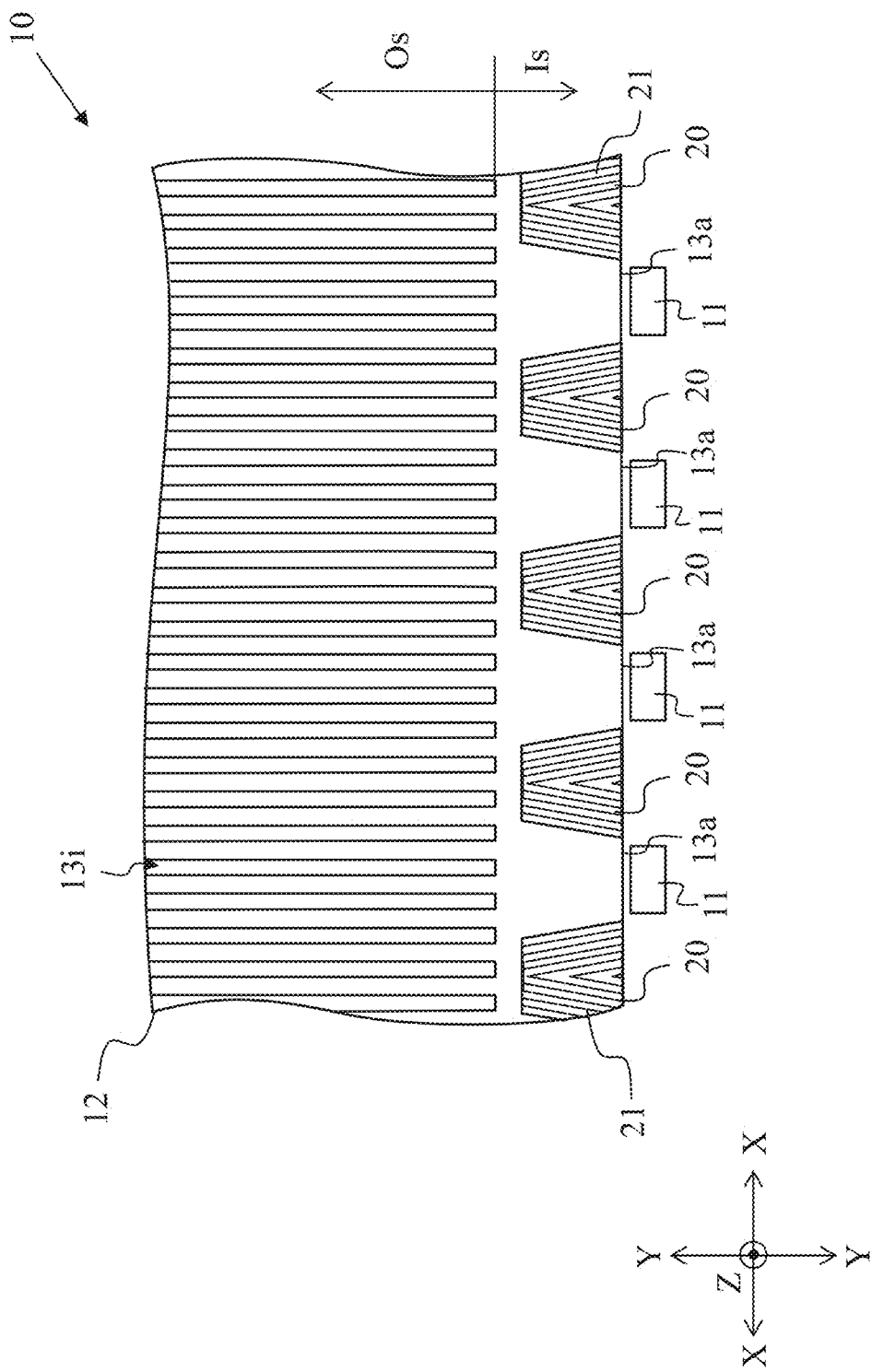
FIG. 9 is an enlarged front view of and around light entry portions of a light guide plate in a backlight unit according to the present invention.
Figure 10:
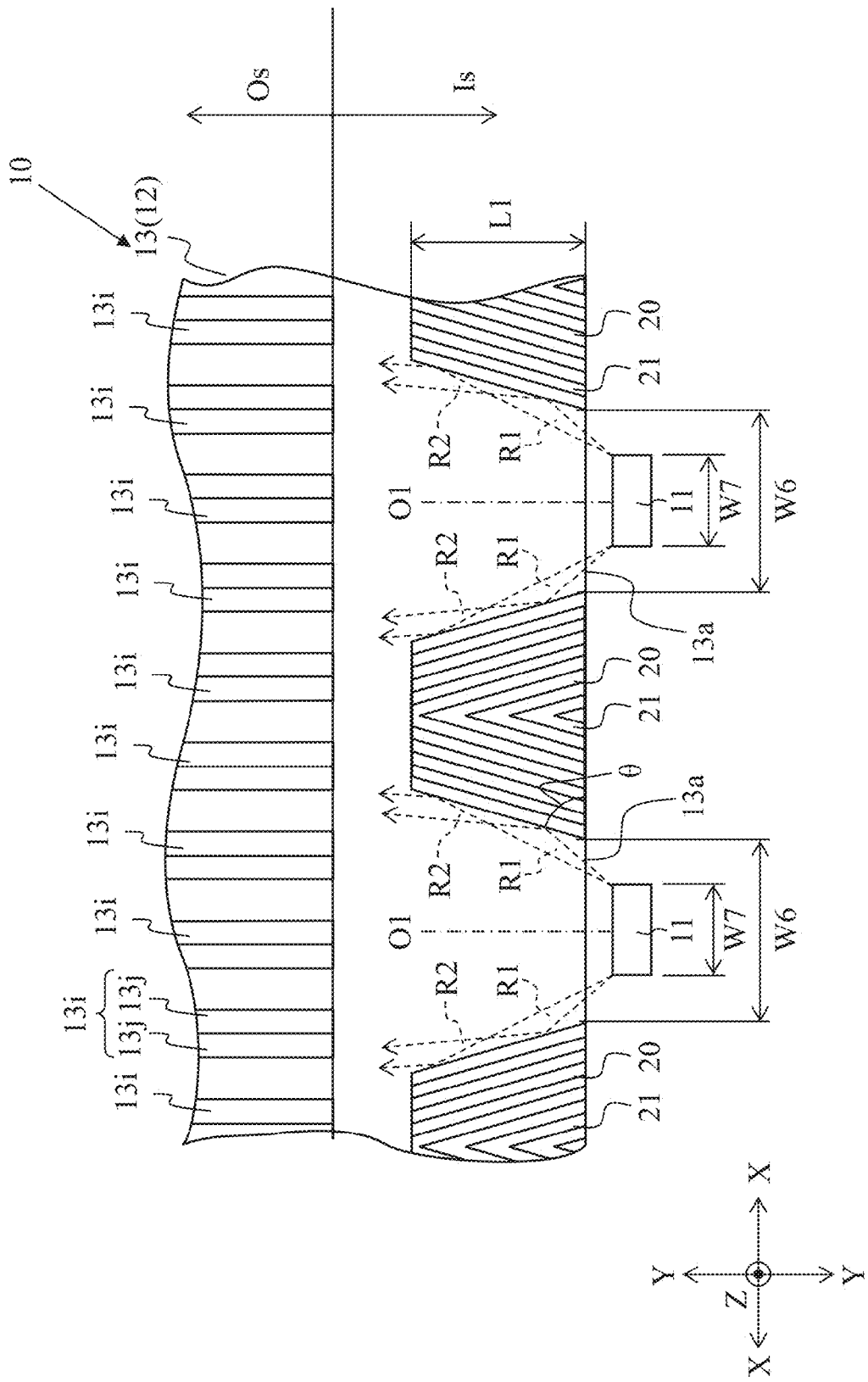
FIG. 10 is an enlarged view of bright line suppression portions of the light guide plate shown in FIG. 9.
Figure 11:
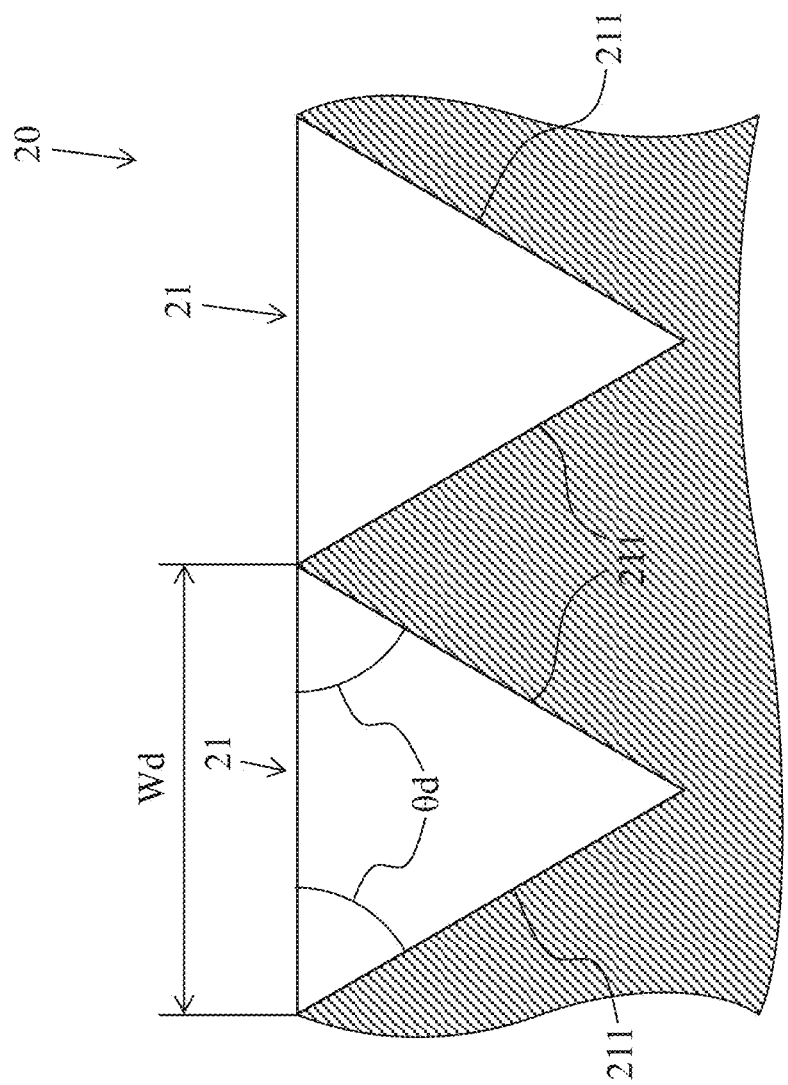
FIG. 11 is a sectional view of the bright line suppression portions shown in FIG. 10.

Thus, in the backlight unit 10, the light guide body 13 is formed so as to suppress appearance of V-shaped bright lines. FIG. 9 is an enlarged front view of and around light entry portions of a light guide plate in a backlight unit according to the present invention. FIG. 10 is an enlarged view of bright line suppressing portions in the light guide plate shown in FIG. 9. FIG. 11 is a sectional view of the bright line suppressing portions shown in FIG. 10. In the following description, the radiation direction of, out of the light emitted from the LEDs 11, the light spreading in the row direction of the LEDs 11 and traveling frontward is referred to as V-shaped bright line direction. The sectional view in FIG. 11 shows a section cut across a line perpendicular to the slant faces of bright line suppressing portions 20.

The light guide prisms 13e and the diffusion prisms 13i mentioned above are formed in the light exit region Os. The backlight unit 10 has the bright line suppressing portions 20 formed in a front part of the light entry region Is.

As seen in a front view, the bright line suppressing portion 20 has the shape of a trapezoid that is line-symmetric about a line parallel to the Y direction, has slant sides inclined θ° relative to the X direction, and has a height L1. As shown in FIGS. 10 and 11, in the bright line suppressing portion 20, a plurality of concave bright line suppression prisms 21 extending along the slant sides of the bright line suppressing portion 20 are formed side by side. Like the slant sides of the bright line suppressing portion 20, the bright line suppression prisms 21 are formed to extend in a direction inclined θ° relative to the X direction. The neighboring bright line suppression prisms 21 are arranged to abut each other; that is, the bright line suppression prisms 21 are arranged with no flat portions in between.

As shown in FIG. 11, the bright line suppression prism 21 has a pair of inclined faces 211 inclined relative to the front flat face of the light entry region Is, and has a concave shape. That is, the bright line suppression prism 21 is a prism having a triangular cross section. The pair of inclined faces 211 are symmetric, and are inclined at an angle θd relative to the front face of the light guide body 13. The bright line suppression prism 21 is formed so as to have a dimension Wd. Since the bright line suppression prisms 21 are arranged with no gaps between them, the array pitch of the bright line suppression prisms 21 is equal to the dimension Wd of the bright line suppression prisms 21.

By use of the light guide body 13 structured as described above, out of the light emitted from the LEDs 11 and entering the light guide body 13 through the light entry portion 13a, the light R1 traveling in the V-shaped bright line direction has its angle changed in a direction closer to the optical axes O1 of the LEDs. Thus, the light R1 with an angular distribution that produces a V-shaped bright line is changed to light with an angular distribution that does not produce a V-shaped bright line. Thus, the light emitted from the LEDs 11 is made even while passing through the light entry region Is before entering the light exit region Os, and thereby appearance of V-shaped bright lines is suppressed.

In a case where the bright line suppressing portions 20 are formed in the light guide body 13, the angular distribution of light is changed by the bright line suppressing portions 20. Thus, entry of light into the low-refraction layer 14 is suppressed (light is totally reflected at the interface with the low-refraction layer 14), and leakage of light through the light exit portion 13b is suppressed. This too helps suppress appearance of V-shaped bright lines.

The angle θ and the height L1 of the slant sides of the plan-view trapezoid of the bright line suppressing portion 20, the dimension Wd of the bright line suppression prism 21, and the inclination angle θd of the inclined faces 211 are set at such values as to change the angle of the light emitted from the LEDs 11 and traveling in the V-shaped bright line direction in a direction closer to the optical axes O1. That is, these values depend on the dimension w7 of the light exit face of the LED 11, the dimension w6 of the light entry portion 13a, and the angle of the V-shaped bright line direction.

For example, in a case where the index of refraction (n1) of the light guide body 13 is 1.59 and the index of refraction (n2) of the low-refraction layer 14 is 1.3, then the V-shaped bright line appears in a direction of about 39° relative to the optical axis O1 (that is, in the V-shaped bright line direction). Here, when, as the above-mentioned values, the dimension w7 of the LED 11 is about 3.0 mm and the dimension w6 of the light entry portion 13a is 1.7 mm, then the height L1 of the plan-view trapezoid of the bright line suppressing portion 20 is about 3.0 mm, the angle θ of the slant sides is about 75°, the dimension Wd of the bright line suppression prism 21 is about 0.02 mm, and the inclination angle θd of the inclined portions 211 is about 55°.

By use of the light guide plate 12 structured as described above, almost all of the light emitted in the V-shaped bright line direction has its angle changed by the bright line suppression prisms 21 in the light entry region Is, and enters the light exit region Os as light R2 with such angles as not (unlikely) to produce a V-shaped bright line. In this way, it is possible to suppress appearance of V-shaped bright lines in the planar light emerging from the light exit portion 13b, and to suppress luminance unevenness in the planar light.

Thus, it is possible to obtain a backlight unit 10 that outputs planar light with highly even luminance from the light exit portion 13b. Moreover, it is possible to efficiently use the light that conventionally ends in producing V-shaped bright lines, and thus to effectively improve light use efficiency and luminance.

Moreover, in the backlight unit 10 according to the present invention, the light guide plate 12 is provided with prisms so that the light guide plate 12 serves to guide light, diffuse it, and suppress bright lines, and this eliminates the need to provide a plurality of optical sheets. It is thus possible to achieve thickness reduction, and to suppress an increase in manufacturing costs. Moreover, no loss of light due to passage through optical sheets arises, and also from this perspective, it is possible to improve light use efficiency.

(Second Embodiment)

Figure 12:
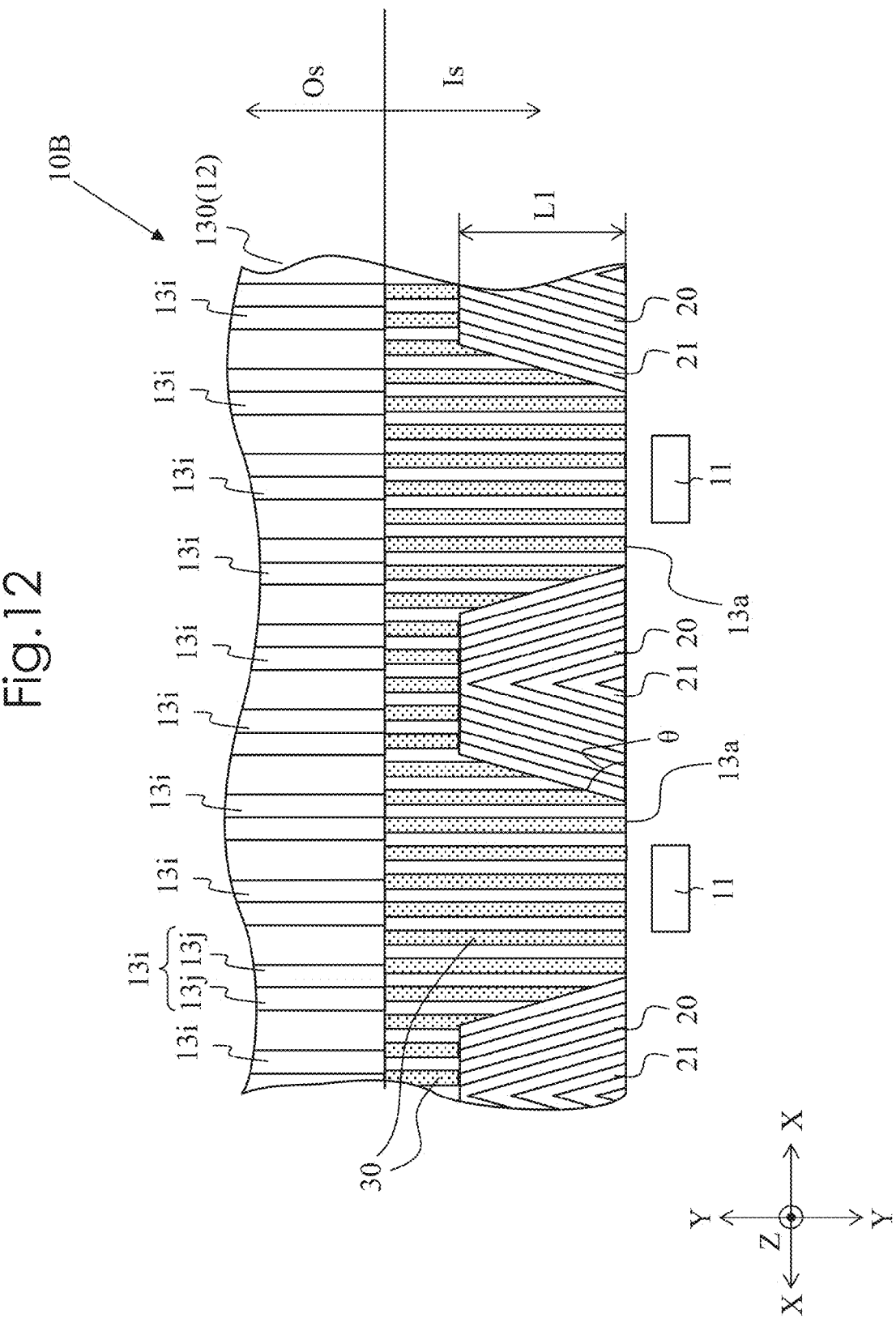
FIG. 12 is a front view of another example of a light guide plate used in a backlight unit as an illumination device according to the present invention.

Another example of an illumination device according to the present invention will be described with reference to the relevant drawing. FIG. 12 is a front view of another example of a light guide plate used in a backlight unit as an illumination device according to the present invention. The backlight unit 10B shown in FIG. 12 is provided with auxiliary prisms 30 in a front part of the light entry region Is, and is otherwise structured in the same manner as the backlight unit 10. Substantially the same parts between the two examples are identified by common reference signs, and no detailed description of such parts will be repeated. In FIG. 12, the auxiliary prisms 30 are hatched for easy recognition.

For the sake of describing the backlight unit 10B, a description is now given of appearance of a bright line other than the V-shaped bright line. The light emitted from the LEDs 11 tends to be brighter (more intense) near the optical axes. When the angle of the light in the V-shaped bright line direction out of the light emitted from the LEDs 11 is changed toward the optical axis direction by the bright line suppressing portions 20, the light concentrates in parts close to the optical axes. A light guide body 130 is provided with diffusion prisms 13i extending in the Y direction with a view to suppressing such concentration of light, but depending on the characteristics of the LEDs 11, bright lines may appear along the optical axes.

That is, if, with a view to suppressing appearance of V-shaped bright lines, the angle of the light in the V-shaped bright line direction is changed toward the optical axes of the LEDs 11 to such a degree as to result in excessive concentration, the diffusion prisms 13i may not diffuse the light sufficiently, leading to appearance of bright lines along the optical axes. To prevent that, in the backlight unit 10B, the auxiliary prisms 30 extending in the same direction as the diffusion prisms 13i are formed in a front part of the light entry region Is of the light guide body 130. In the light entry region Is, the directivity of the light emitted from the LEDs 11 (the light around the optical axes or the light in and around the V-shaped bright line direction) has only to be diffused to some degree. Accordingly, the auxiliary prisms 30 have a smaller cross-sectional area than the diffusion prisms 13i. The shape of the auxiliary prisms 30 may be identical with (geometrically similar to) that of the diffusion prisms 13i, or may be different from that of the diffusion prisms 13i.

In the light guide body 130, the auxiliary prisms 30 are given a length equal to the Y-direction length of the light entry region Is. This, however, is not meant as any limitation: any of varying lengths may be adopted so long as light can be diffused sufficiently in the lateral direction (X direction) in the light entry region Is.

Owing to the auxiliary prisms 30 formed in the light entry region Is of the light guide body 130, the light emitted from the LEDs in directions other than the V-shaped bright line direction (chiefly the light emitted in the optical axis direction) is diffused in the lateral direction (X direction). Moreover, the auxiliary prisms 30 diffuse, in the lateral direction (X direction), the light emitted in the V-shaped bright line direction and having its angled changed by the bright line suppressing portion 20. By diffusing light in the lateral direction (X direction) inside the light entry region Is in this way, it is possible to suppress concentration of the light that has reached the light exit region Os near the optical axes.

The light that has entered the light exit region Os is further diffused in the lateral direction (X direction) by the diffusion prisms 13i.

Thus, the light that has entered the light guide plate 12 is diffused in the direction in which the LEDs 11 are arrayed (that is, in the X direction) both in the light entry region Is and the light exit region Os of the light guide plate 12. In this way, it is possible to suppress appearance of V-shaped bright lines by the action of the bright line suppressing portion 20, and also to suppress appearance of bright lines near the optical axes of the LEDs 11.

The other effects of the second embodiment are the same as those of the first embodiment described previously.

(Third Embodiment)

Figure 13:
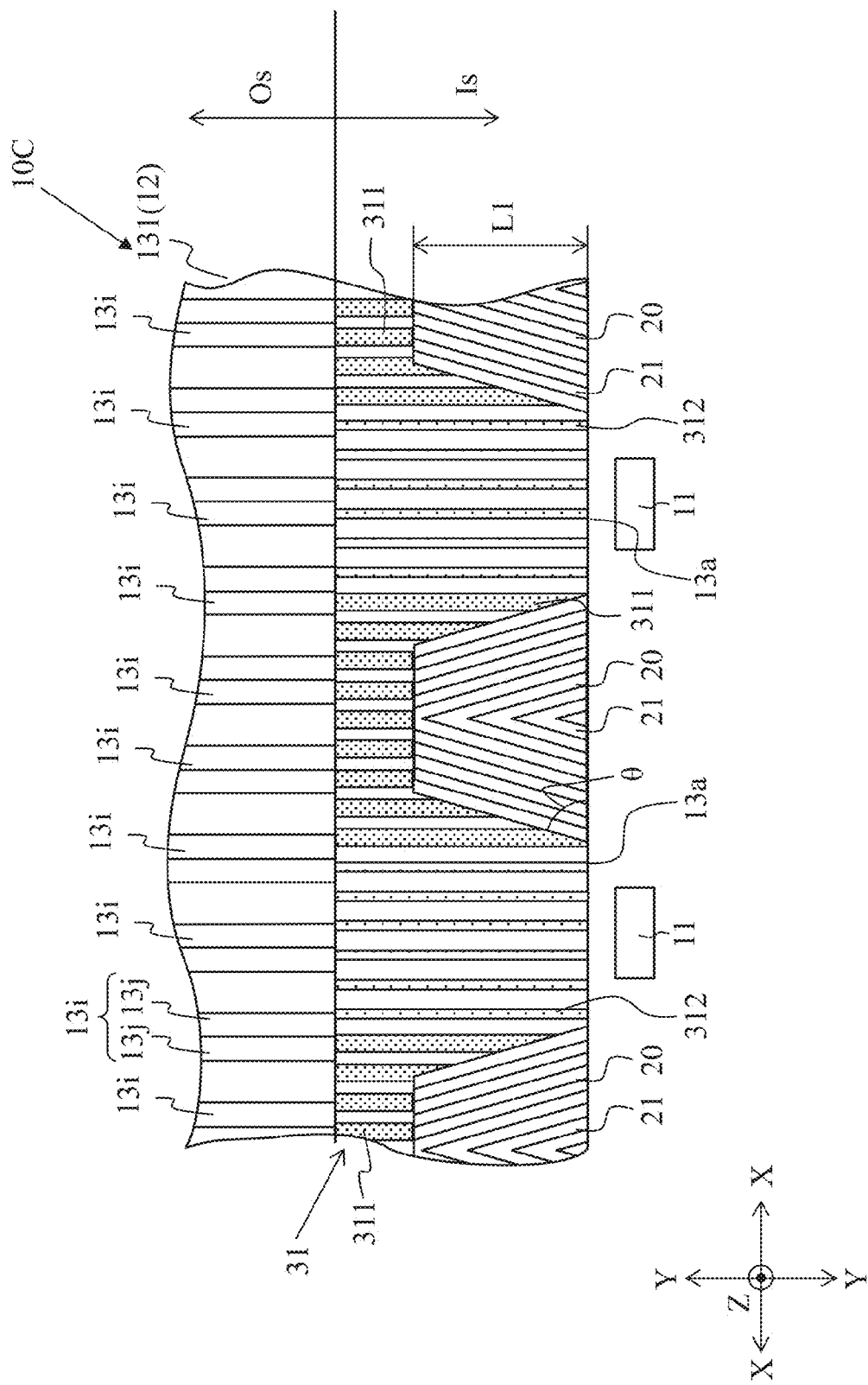
FIG. 13 is a front view of yet another example of a light guide plate used in a backlight unit as an illumination device according to the present invention.

Yet another example of an illumination device according to the present invention will be described with reference to the relevant drawing. FIG. 13 is a front view of yet another example of a light guide plate used in a backlight unit as an illumination device according to the present invention. The backlight unit 10C shown in FIG. 13 has different auxiliary prisms 31 in a light guide body 131, and is otherwise structured in the same manner as the backlight unit 10B shown in FIG. 12. Accordingly, substantially the same parts between the backlight unit 10C and the backlight unit 10B are identified by common reference signs, and no detailed description of such parts will be repeated. In FIG. 13, the auxiliary prisms 31 are hatched for easy recognition.

Some LEDs 11 emit intense light both around their optical axes and in the V-shaped bright line direction. In the backlight unit 10C, which employs such LEDs 11, neighboring LEDs 11 both emit light in the V-shaped bright line direction, and thus light tends to be intense in parts where a V-shaped bright line is likely to appear, that is, around the bright line suppressing portions 20. Light tends to be intense also around the optical axes.

In a case where prisms are formed on a surface of a light guide body, the larger the area occupied by the prisms per unit area of the region where the prisms are formed, the greater the effect of diffusing light. This property of prisms is exploited in the backlight unit 10C: in a front part of the light entry region Is of the light guide body 131, prisms are formed with different dimensions (that is, depths) around the bright line suppressing portions 20 and in parts abutting the light entry portions 13a.

More specifically, in the backlight unit 10C, in parts near the bright line suppressing portions 20, first auxiliary prisms 311 are formed, and in parts abutting the light entry portions 13a, second auxiliary prisms 312 with a smaller dimension than the first auxiliary prisms 311 are formed at an equal pitch. The first and second auxiliary prisms 311 and 312 have geometrically similar cross-sectional shapes that differ only in size. With this structure, the areas occupied by the first and second auxiliary prisms 311 and 312 are adjusted.

Thus, out of the light emitted from the LEDs 11, the light emitted in the V-shaped bright line direction and having its angle changed by the bright line suppressing portions 20 is diffused by the first auxiliary prisms 311. On the other hand, out of the light emitted from the LEDs 11, the light emitted in directions other than in the V-shaped bright line direction (chiefly, the light emitted in the optical axis direction of the LEDs 11) is diffused by the second auxiliary prisms 312. That is, the first auxiliary prisms 311 serve to suppress appearance of V-shaped bright lines, and the second auxiliary prisms 312 serve to suppress bright lines around the optical axes of the LEDs 11.

As described above, the areas occupied by the first and second auxiliary prisms 311 and 312 are adjusted, and this helps increase the diffusion efficiency (or diffusion accuracy) of the light emitted in the V-shaped bright line direction and having its direction changed by the bright line suppressing portions 20 as compared with the light around the optical axes of the LEDs 11. It is thus possible to suppress appearance of V-shaped bright lines, and also to suppress appearance of bright lines around the optical axes of the LEDs 11, and hence to suppress luminance unevenness in the light emerging from the light exit portion 13b.

In a case where V-shaped bright lines can be suppressed sufficiently with the bright line suppressing portions 20, the second auxiliary prisms 312 alone may be formed. In the opposite case, where bright lines around the optical axes of the LEDs 11 are unlikely to appear, the first auxiliary prisms 311 alone may be formed.

The other effects of the third embodiment are the same as those of the second embodiment described previously.

(Fourth Embodiment)

Figure 14:
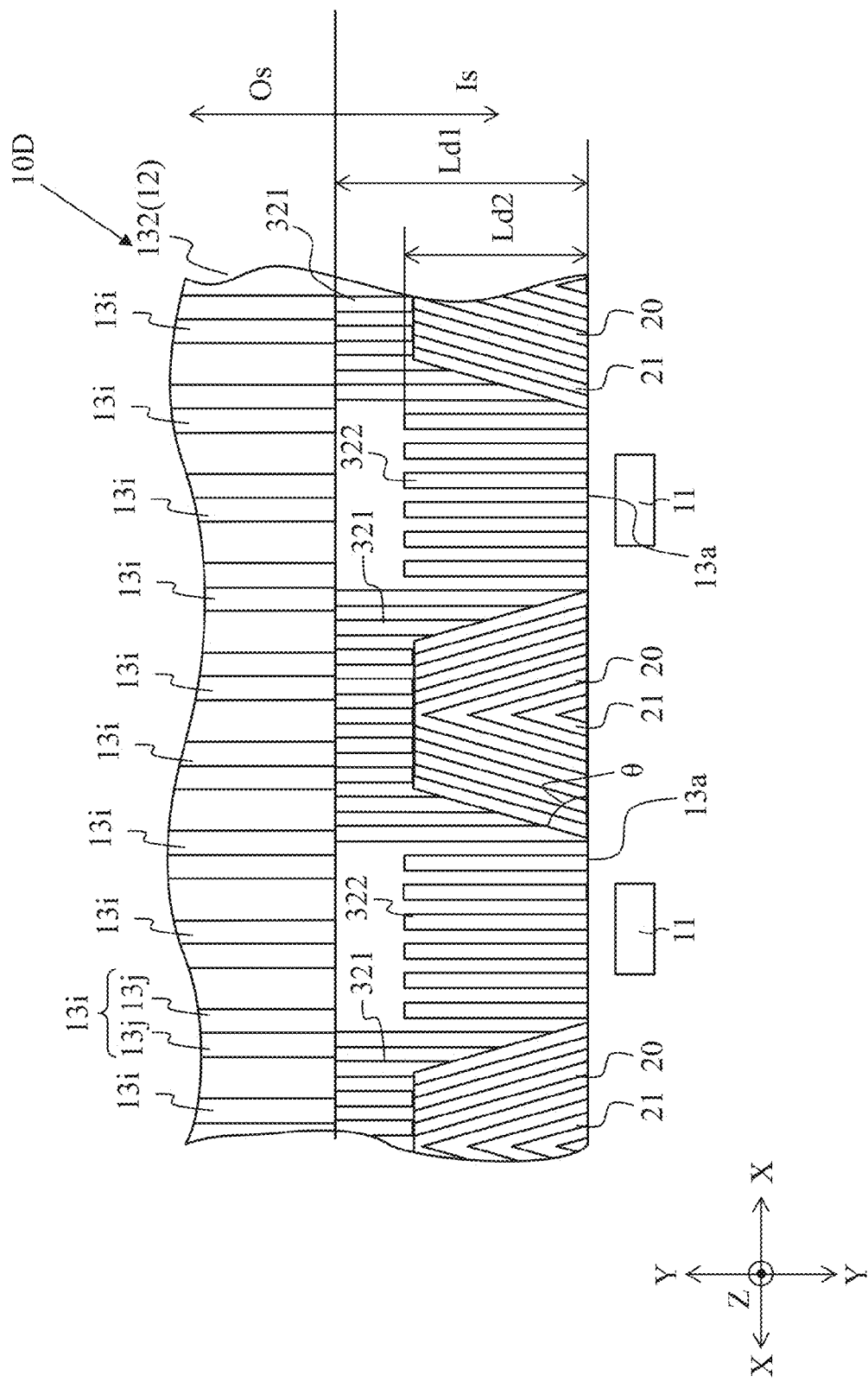
FIG. 14 is a front view of still another example of a light guide plate used in a backlight unit as an illumination device according to the present invention.

Still another example of an illumination device according to the present invention will be described with reference to the relevant drawing. FIG. 14 is a front view of still another example of a light guide plate used in a backlight unit as an illumination device according to the present invention. The backlight unit 10D shown in FIG. 14 has different auxiliary prisms 32 in a light guide body 132, and is otherwise structured in the same manner as the backlight unit 10B shown in FIG. 12. Accordingly, substantially the same parts between the backlight unit 10D and the backlight unit 10B are identified by common reference signs, and no detailed description of such parts will be repeated.

As mentioned in connection with the third embodiment, light diffusion efficiency depends on the area occupied by prisms. This is exploited here by forming first auxiliary prisms 321 with a length Ld1 and forming second auxiliary prisms 322 with a length Ld2 smaller than the length Ld1. The first and second auxiliary prisms 321 and 322 used here have the same cross-sectional shape and the same cross-sectional area.

Thus, through adjustment of the length Ld1 of the first auxiliary prisms 321 and the length Ld2 of the second auxiliary prisms 322, the areas occupied by those prisms are so adjusted as to increase light diffusion efficiency (or diffusion accuracy).

With the backlight unit 10D employing the light guide plate 12 structured as described above, it is possible to suppress appearance of V-shaped bright lines, and also to suppress appearance of bright lines around the optical axes of the LEDs 11, and hence to suppress luminance unevenness in the planar light emerging from the light exit portion 13b.

The other effects of the fourth embodiment are similar to those of the third embodiment described previously.

(Fifth Embodiment)

Figure 15:
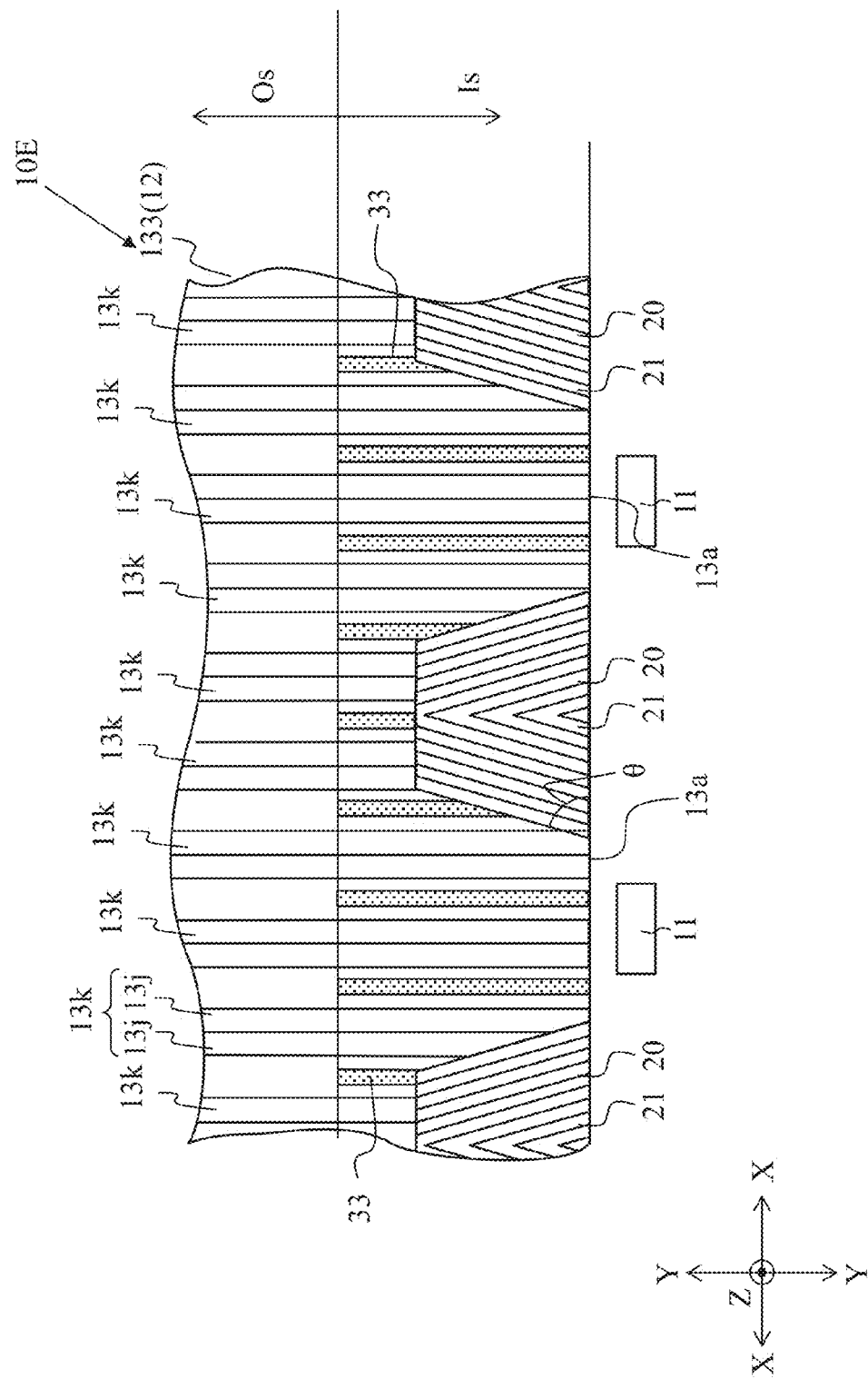
FIG. 15 is a front view of still another example of a light guide plate used in a backlight unit as an illumination device according to the present invention.

A still another example of an illumination device according to the present invention will be described with reference to the relevant drawing. FIG. 15 is a front view of still another example of a light guide plate used in a backlight unit as an illumination device according to the present invention. The backlight unit 10E shown in FIG. 15 is provided with diffusion prisms 13k in place of the diffusion prisms 13i, and is otherwise structured in the same manner as the backlight unit 10. Substantially the same parts between the two examples are identified by common reference signs, and no detailed description of such parts will be repeated.

In the embodiments described thus far, the diffusion prisms 13i are formed in the light exit region Os. In the backlight unit 10E shown in FIG. 15, the diffusion prisms 13k, which have the same cross-sectional shape and the same cross-sectional area as the diffusion prisms 13i, are formed both in the light entry region Is and in the light exit region Os of a light guide body 133. That is, it can be said that the diffusion prisms 13k are a version of the diffusion prisms 13i which are extended into the light entry region Is. With this structure, owing to the diffusion prisms 13k being formed in the light entry region Is, also the light passing through the light entry region Is is diffused in the lateral direction (X direction).

Thus, it is possible to suppress appearance of V-shaped bright lines and of bright lines near the optical axes of the LEDs 11, and hence to suppress luminance unevenness in the planar light emerging from the light exit portion 13b.

The other effects of the fifth embodiment are the same as those of the first embodiment described previously.

Figure 16:
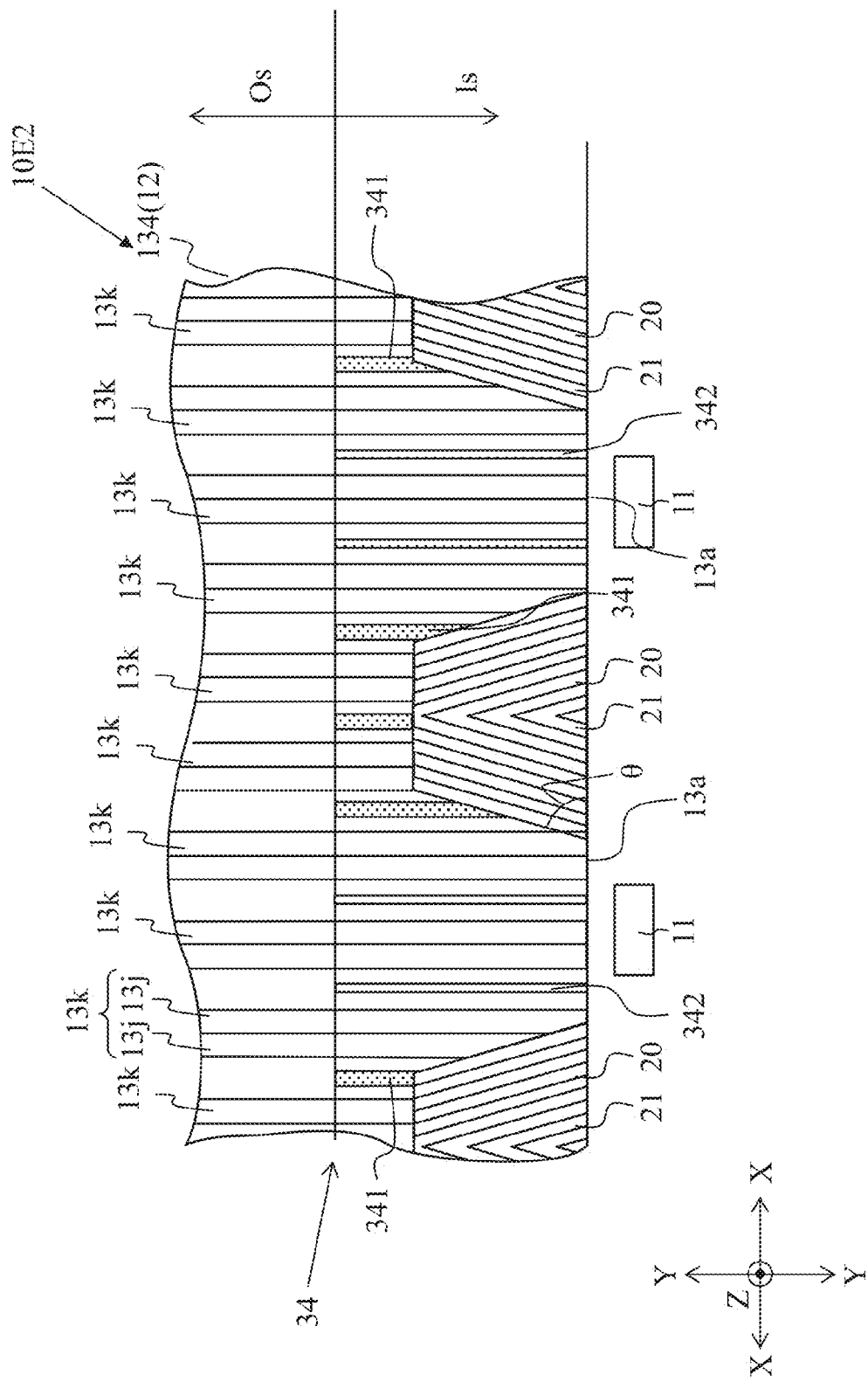
FIG. 16 is a front view of still another example of a light guide plate used in a backlight unit as an illumination device according to the present invention.
Figure 17:
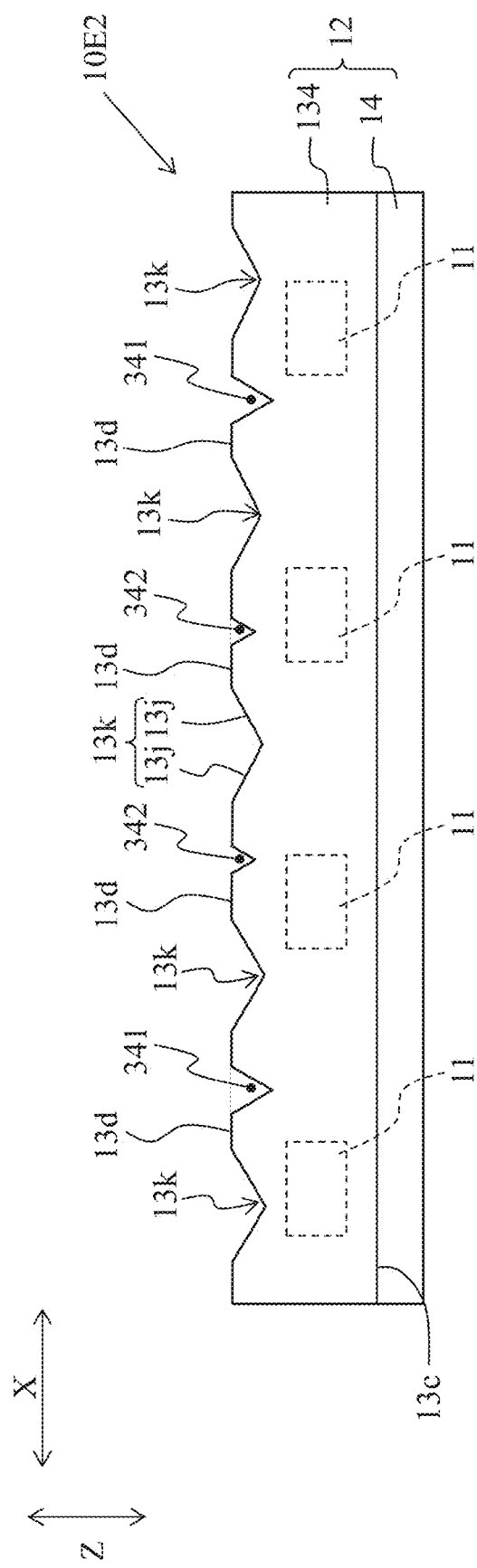
FIG. 17 is a sectional view of the light guide plate shown in FIG. 16.

A modified example of this embodiment will now be described with reference to the relevant drawings. FIG. 16 is a front view of a still another example of a light guide plate used in a backlight unit as an illumination device according to the present invention, and FIG. 17 is a sectional view of the light guide plate shown in FIG. 16. As shown in FIG. 16, in the backlight unit 10E2, diffusion prisms 13k are formed in the light entry region Is of a light guide body 134, and in addition auxiliary prisms 34 are also formed there. Otherwise, the structure here is the same as that of the backlight unit 10E.

As shown in FIG. 16, in the light entry region Is of the light guide body 134, the diffusion prisms 13k and the bright line suppressing portions 20 (bright line suppression prisms 21) are formed. In flat portions 13d between the neighboring diffusion prisms 13k, the auxiliary prisms 34 for assisting the diffusion of light by the diffusion prisms 13k are formed.

The auxiliary prisms 34 are concave prisms formed parallel to the diffusion prisms 13k. The auxiliary prisms 34 include first auxiliary prisms 341 formed close to the bright line suppressing portions 20 and second auxiliary prisms 342 abutting the light entry portions 13a.

As shown in FIG. 17, the first and second auxiliary prisms 341 and 342 have the same shape (are geometrically similar) but have different cross-sectional areas. That is, the first auxiliary prisms 341 are given a lateral dimension larger than that of the second auxiliary prisms 342. In this way, the areas occupied by the first and second auxiliary prisms 341 and 342 are adjusted, and thereby the light diffusion efficiency (or diffusion accuracy) in the first and second auxiliary prisms 341 and 342 is adjusted adequately.

In contrast to the backlight unit 10E, the backlight unit 10E2 has the auxiliary prisms 34 provided in the light entry region Is, and this helps increase diffusion efficiency (or diffusion accuracy) in the lateral direction in the light entry region Is.

In the backlight unit 10E2, the first and second auxiliary prisms 341 and 342 may be given the same shape and the same size. In a case where V-shaped bright lines can be suppressed sufficiently with the bright line suppressing portions 20, the second auxiliary prisms 342 alone may be formed. In the opposite case, where bright lines around the optical axes of the LEDs 11 are unlikely to appear, the first auxiliary prisms 341 alone may be formed.

(Sixth Embodiment)

Figure 18:
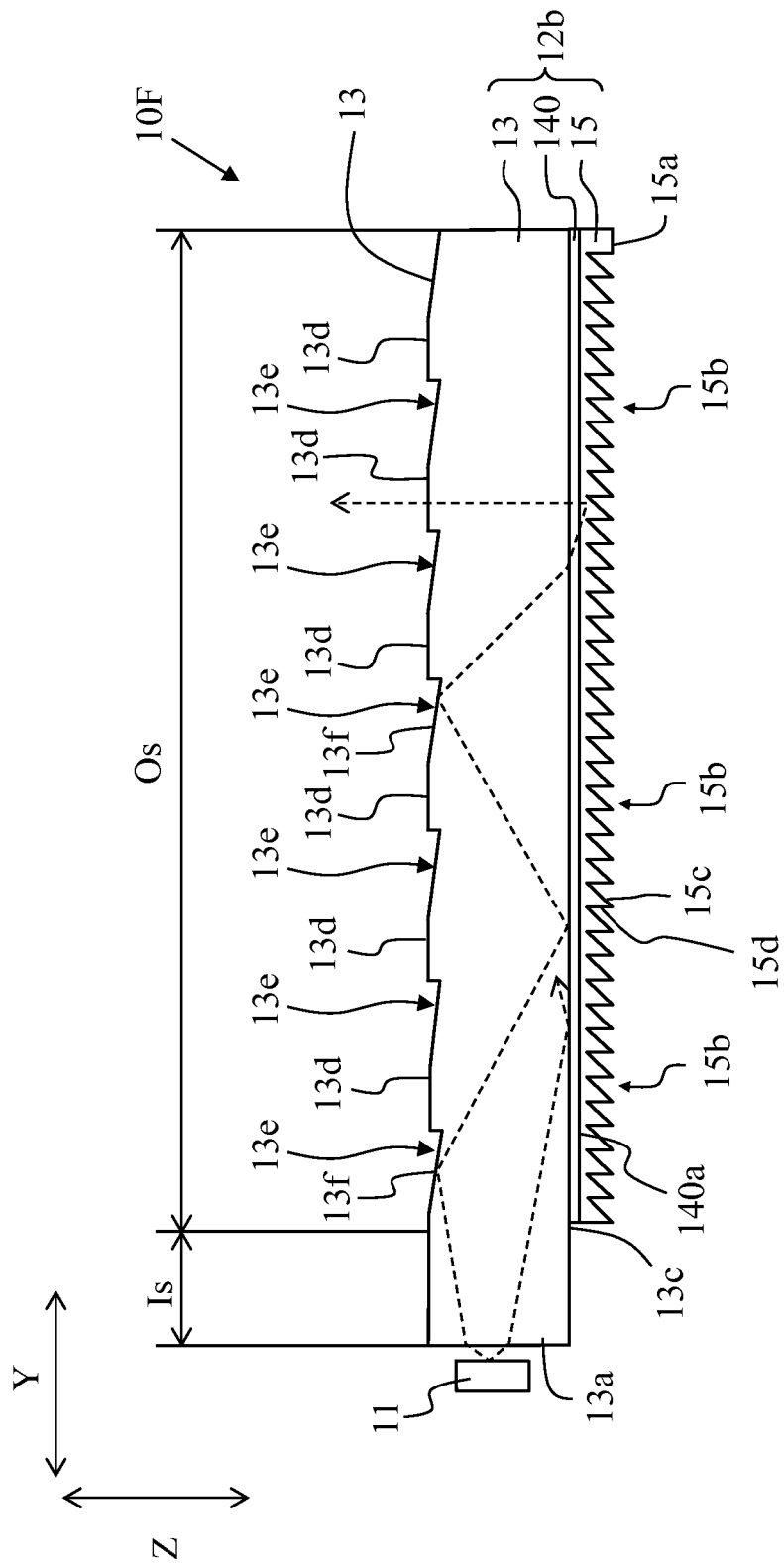
FIG. 18 is a side view of an example of a light guide plate used in a backlight unit as an illumination device according to the present invention.

Another example of an illumination device according to the present invention will be described with reference to the relevant drawing. FIG. 18 is a side view of an example of a light guide plate used in a backlight unit as an illumination device according to the present invention. The backlight unit 10F shown in FIG. 18 is provided with a low-refraction layer 140 and a prism layer 15, and is otherwise structured in the same manner as the backlight unit 10. Substantially the same parts between the two examples are identified by common reference signs, and no detailed description of such parts will be repeated.

As shown in FIG. 18, in the backlight unit 10F, a light guide plate 12b has the light guide body 13, the low-refraction layer 140, and the prism layer 15. More specifically, on the rear face of the light guide body 13, the low-refraction layer 140 is arranged in close contact, and on the face of the low-refraction layer 140 opposite from the light guide body 13, the prism layer 15 is arranged in close contact.

On the face of the prism layer 15 opposite from the low-refraction layer 140, prisms 15b are formed which have a shape similar to that in the low-refraction layer 14 of the backlight unit 10. When the index of refraction of the light guide body 13 is represented by n1, the index of refraction of the low-refraction layer 14 is represented by n2, and the index of refraction of the prism layer 15 is represented by n3, then preferably these satisfy the relationship $n2 < n3 \leq n1$. The prism 15bs are composed of inclined faces 15c inclined relative to rear faces 15a and vertical faces 15d perpendicular to the rear faces 15a.

In the backlight unit 10F, the light emitted from the LEDs 11 is guided by being reflected repeatedly between the light exit portion 13b and the rear face 13c of the light guide body 13 such that the angle of incidence with respect to the rear face 13c of the light guide body 13 decreases progressively before entering the low-refraction layer 140. Since the prism layer 15 has a higher index of refraction than the low-refraction layer 140, the light that has entered the low-refraction layer 140 enters the prism layer 15 without being totally reflected on the rear face 140a of the low-refraction layer 140 (that is, at the interface between the low-refraction layer 140 and the prism layer 15).

Then, substantially all the light that has entered the prism layer 15 is, at the prisms 15b, totally reflected frontward, or first transmitted and then totally reflected. The condensed light once again enters the low-refraction layer 140 and then the light guide body 13, and eventually emerges frontward from the light exit portion 13b.

In this embodiment, as described above, on the rear face 140a of the low-refraction layer 140, the prism layer 15 is provided with no layer of air interposed, and on the rear face 15a of the prism layer 15, the prisms 15b are formed. Thus, there is no need to provide prisms on the low-refraction layer 140, and this helps reduce the thickness of the low-refraction layer 140. A light-transmitting material with a comparatively low index of refraction as can be used in the low-refraction layer 140 is often expensive, and therefore providing the prism layer 15 and thereby reducing the thickness of the low-refraction layer 140 helps suppress an increase in the manufacturing cost of the light guide plate 12b.

The other effects of the sixth embodiment are the same as those of the first embodiment described previously. Auxiliary prisms like those described above may be formed in a front part of the light entry region of a light guide body used in a backlight unit structured as described above.

Figure 19:
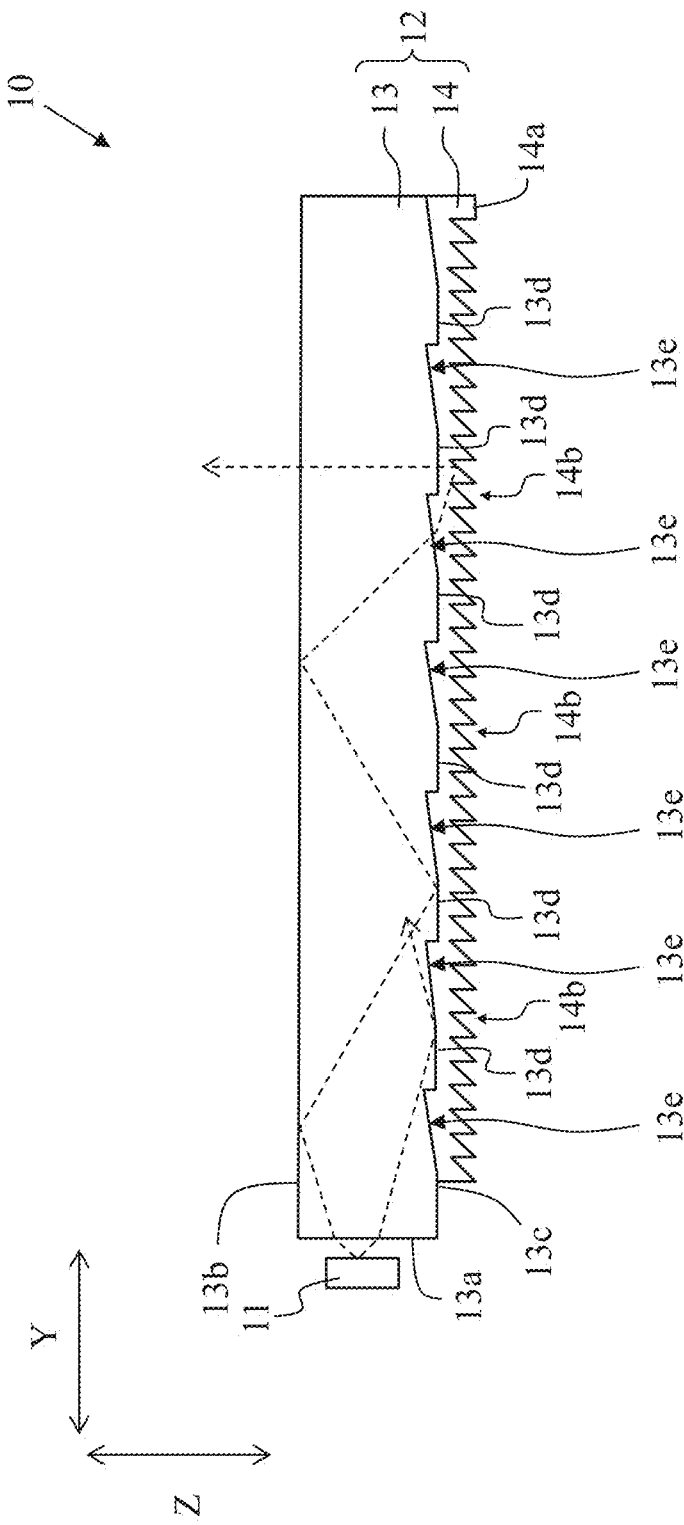
FIG. 19 is a diagram showing a modified example of the backlight unit shown in FIG. 2.
Figure 20:
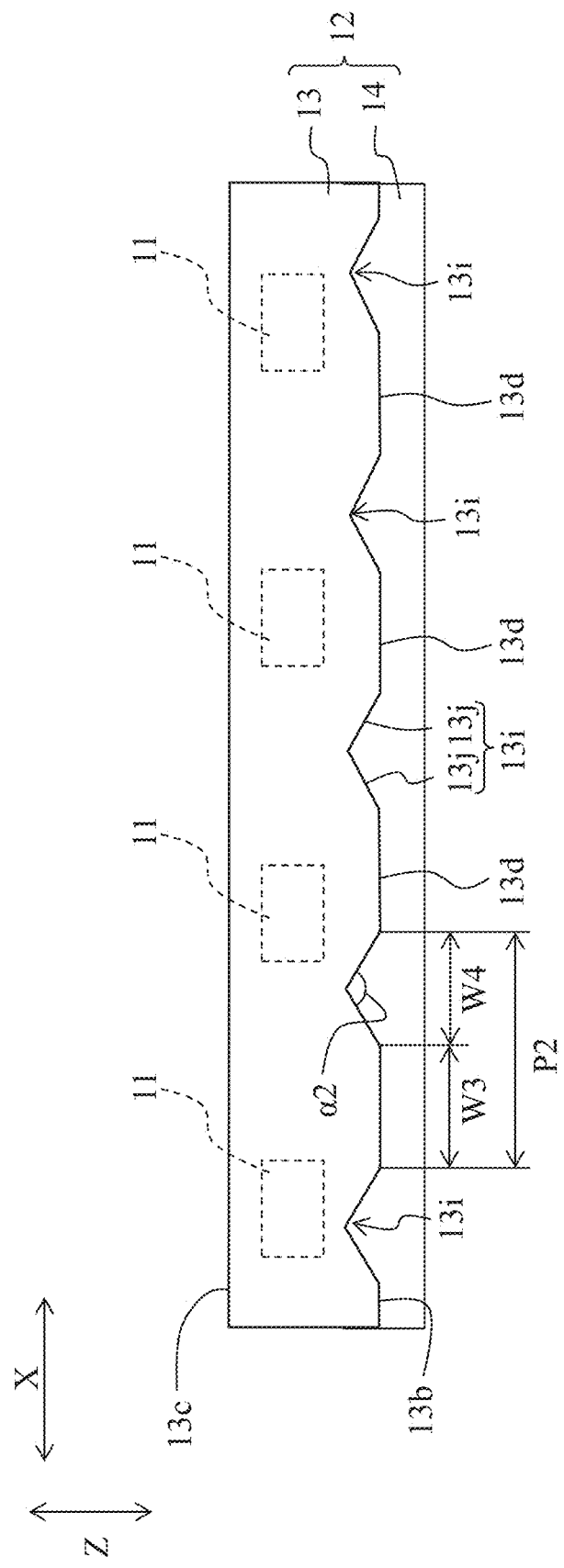
FIG. 20 is a diagram showing a modified example of the backlight unit shown in FIG. 5.

The embodiments described hereinabove deal with examples where prisms for progressively reducing the angle of incidence of the light from LEDs with respect to the rear face of a light guide body, and prisms for diffusing light in the lateral direction, are formed in a light exit portion (at the front face) of the light guide body. This, however, is not meant as any limitation. Such prisms may be formed other than in a light exit portion (at the front face) of a light guide body. For example, as shown in FIG. 19, light guide prisms 13e may be formed at the rear face 13c of the light guide body 13. For another example, as shown in FIG. 20, diffusion prisms 13i may be formed at the rear face 13c of the light guide body 13. The diffusion prisms 13e and the diffusion prisms 13i may both be formed at the rear face 13c of the light guide body 13, or either the former or the latter alone may be formed at the rear face 13c of the light guide body 13.

(Practical Examples)

The present inventors conducted simulations to test the effect of illumination devices according to the present invention. The procedure and the results of the simulations are presented below. First, a description will be given of the model illumination devices used in the simulations. In the simulations described below, to verify the effect of the present invention, an illumination device structured according to the present invention is referred to as Practical Example, and an illumination device with a conventional structure is referred to as Conventional Example.

First, the simulation model of Practical Example will be described. The simulation model of Practical Example adopts the same structure as the backlight unit 10E2. Specifically, in a light guide body 134, diffusion prisms 13k are formed to reach into a light entry region Id, and the light entry region Is is provided with bright line suppressing portions 20 (bright line suppression prisms 21), first auxiliary prisms 341, and second auxiliary prisms 342.

In contrast to the simulation model of Practical Example, the simulation model of Conventional Example employs a light guide plate provided with a light guide body having no bright line suppressing portions, no first auxiliary prisms, and no second auxiliary prisms.

Figure 21:
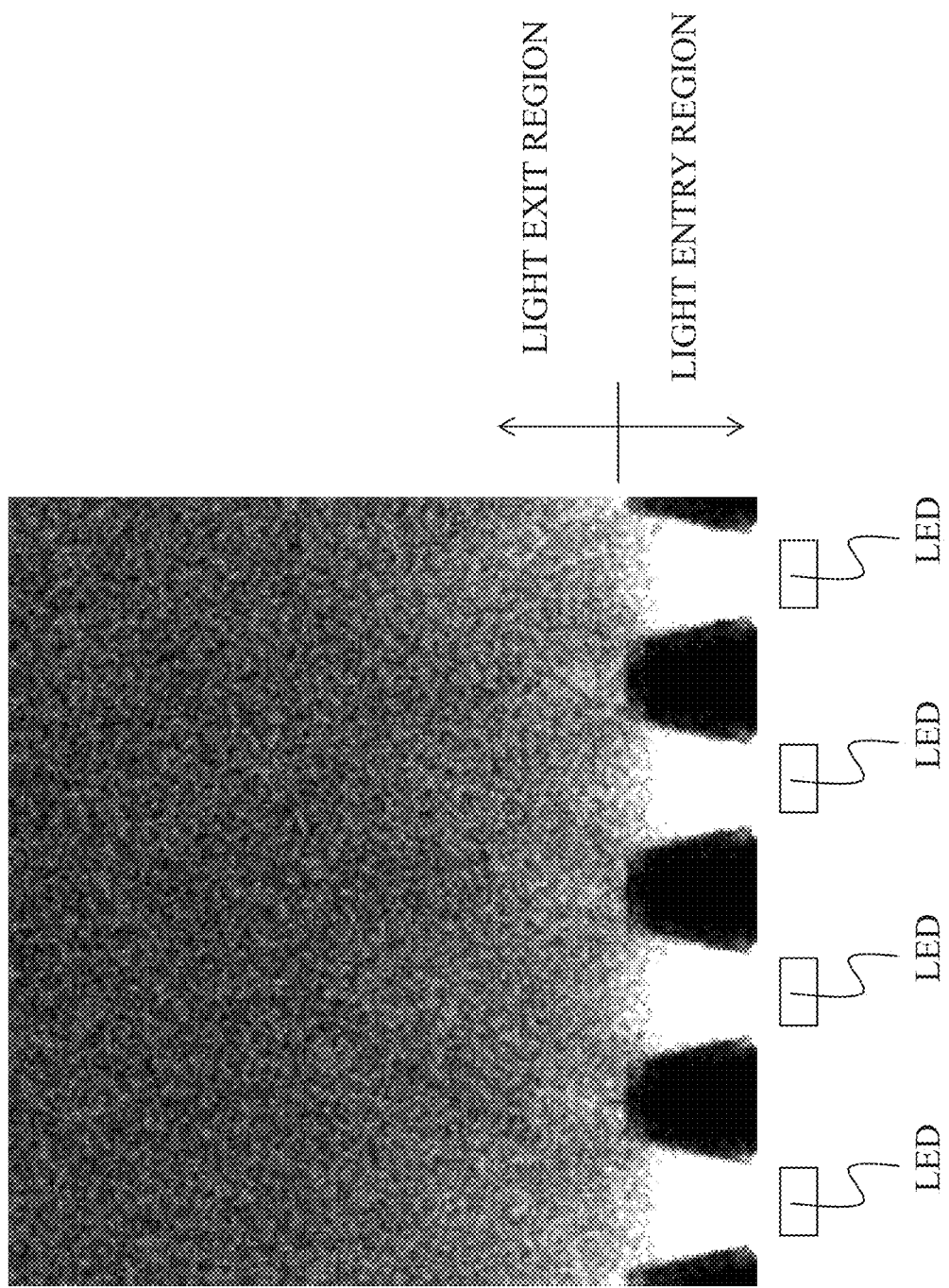
FIG. 21 is a diagram showing results of simulations with a practical example.

By use of these simulation models, for each of Practical Example and Conventional Example, an equal number of LEDs were arranged on a side face of the light guide plate so as to shine light into it through the side face, and meanwhile the unevenness of the light emerging from the light exit region of the backlight unit was determined. FIG. 21 is a diagram showing the simulation result with Practical Example, and FIG. 22 is a diagram showing the simulation result with Conventional Example.

As shown in FIG. 21, in Practical Example, the light entry region Is had the shadows of the bright line suppression portions along with bright parts radiating from the light entry portions. By contrast, the light exit region Os had no notably bright parts (bright lines); in particular, bright lines between neighboring LEDs, that is, V-shaped bright lines, and also bright lines around the optical axes of the LEDs, were suppressed.

Figure 22:
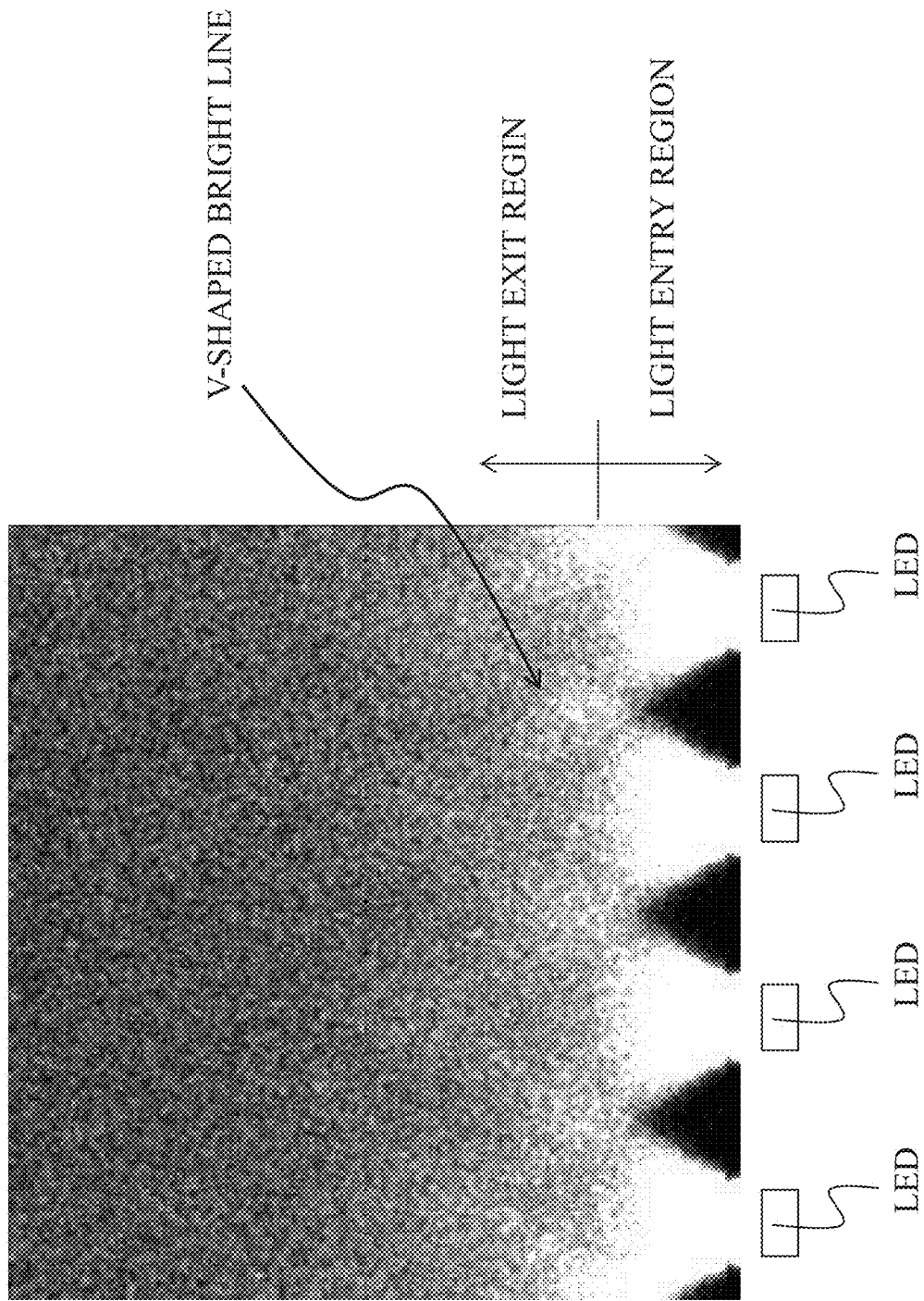
FIG. 22 is a diagram showing results of simulations with a conventional example.

On the other hand, as shown in FIG. 22, in Conventional Example, the light emitted radially from the LEDs had higher luminance in parts where light from neighboring LEDs overlapped; that is, V-shaped bright lines appeared.

Based on the foregoing, with a structure according to the present invention, it is possible to effectively suppress V-shaped bright lines. Moreover, the angle of the light emitted in the V-shaped bright line direction is not changed excessively toward the optical axes of the LEDs, and thus bright lines are less likely to appear also around the optical axes of the LEDs. Based on the foregoing, it can be concluded that an illumination device according to the present invention can output planar light with little luminance unevenness.

Figure 23:
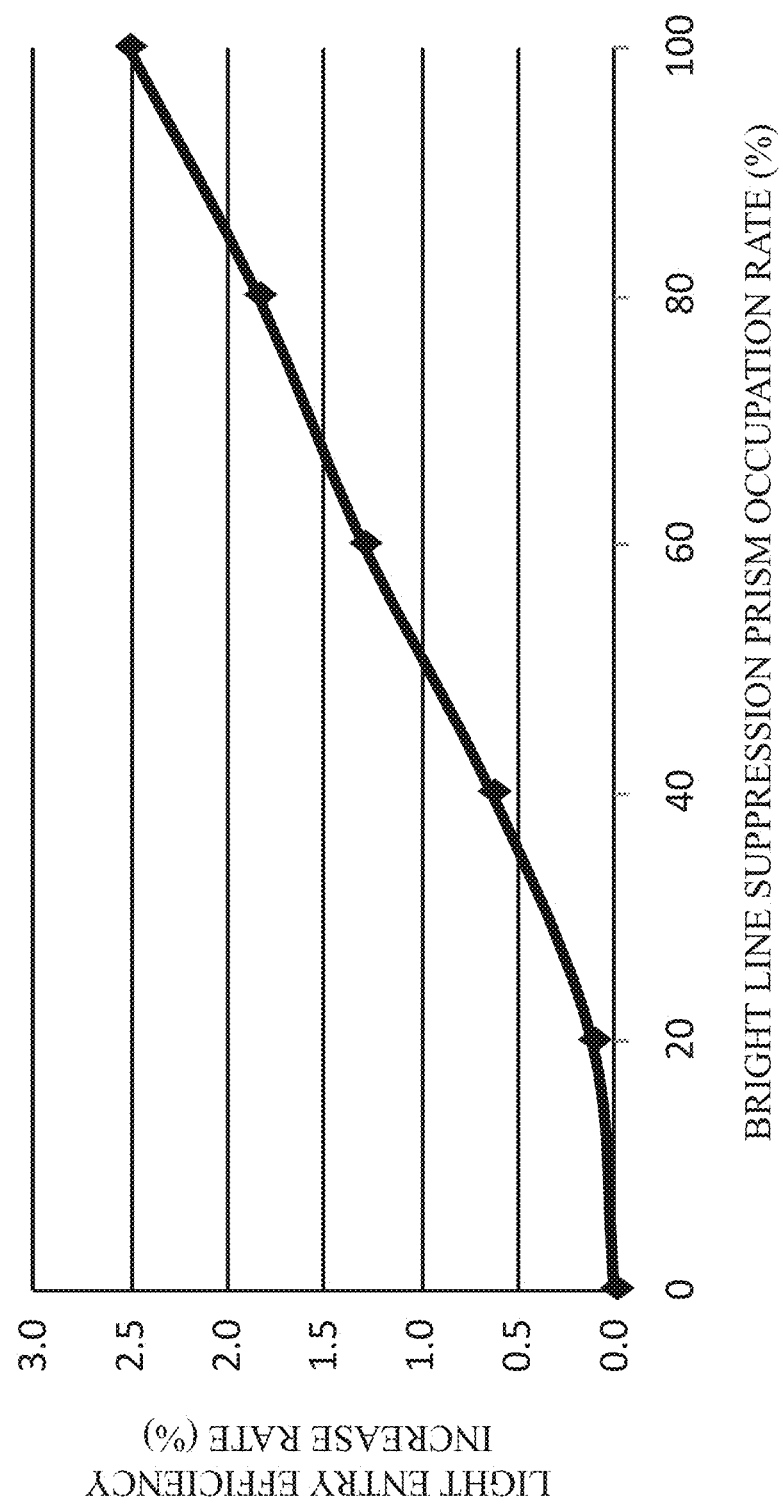
FIG. 23 is a plot of simulation results.

The present inventors conducted further simulations to test the effect of bright line suppression prisms in an illumination device according to the present invention. FIG. 23 is a plot showing the results of the simulations. In FIG. 23, the rate of increase in light entry efficiency is taken along the vertical axis, and the rate of occupation by bright line suppression prisms is taken along the horizontal axis.

In FIG. 23, the increase in light entry efficiency is plotted against the rate of occupation by bright line suppression prisms, relative to the light entry efficiency with the occupied area at 0%. FIG. 23 assumes that, when the dimension Wd is about 0.02 mm, the rate of occupation by bright line suppression prisms equals 100%.

In the simulations, the light entry efficiency was measured first with no bright line suppression prisms formed (with the occupied area at 0%), and thereafter with the rate of occupation by bright line suppression prisms raised in steps of 20%.

FIG. 23 reveals that the higher the rate of occupation by bright line suppression prisms, the higher the light entry efficiency. Based on this, it can be said that, with an illumination device according to the present invention, it is possible to increase light use efficiency and to reduce energy consumption. Specifically, when the index of refraction (n1) of the light guide body 13 equals 1.59 and the index of refraction (n2) of the low-refraction layer 14 equals 1.3, then there is light that emerges without its angle being changed by the shape of the light guide prisms 13e (lost light that cannot be controlled by a difference in index of refraction). The higher the rate of occupation by bright line suppression prisms, the smaller the amount of such lost light, and thus the higher the light entry efficiency.

(Seventh Embodiment)

A liquid crystal display device provided with a backlight unit as an illumination device according to the present invention will now be described with reference to the relevant drawing. FIG. 24 is an exploded perspective view of a liquid crystal display device as one example of a display device according to the present invention. In a liquid crystal display device according to the present invention, any of the backlight units 10 to 10F of the previously described embodiments can be used; in the liquid crystal display device A of this embodiment, the backlight unit 10 is used as a representative.

As shown in FIG. 24, in the liquid crystal display device A according to the present invention, on the front side of the backlight unit 10, a liquid crystal panel unit 40 is arranged. The liquid crystal panel unit 40 has a liquid crystal panel 41 having liquid crystal sealed in it and polarizer plates 42 bonded one to each of the front side (observer side) and the rear side (the backlight unit 10 side) of the liquid crystal panel 41. The liquid crystal panel 41 includes an array substrate 411, a counter substrate 412 arranged to face the array substrate 411, and a liquid crystal layer (unillustrated) filling between the array substrate 411 and the counter substrate 412.

On the array substrate 411, there are arranged source conductors and gate conductors which are perpendicular to each other, switching devices (for example, thin-film transistors) connected to the source and gate conductors, pixel electrodes connected to the switching devices, an alignment film, etc. On the counter substrate 412, there are arranged a color filter composed of a predetermined array of differently colored, namely red, green, and blue (RGB), segments, a common electrode, an alignment film, etc.

When the switching devices on the array substrate 411 are driven with drive signals, at each pixel on the liquid crystal panel 41, a voltage is applied between the array substrate 411 and the counter substrate 412. As the voltage between the array substrate 411 and the counter substrate 412 varies, the degree of transmission of light at each pixel changes. Thereby, an image is displayed in an image display area on the observer side of the liquid crystal panel 41.

Using the backlight unit 10 according to the present invention results in suppressed luminance unevenness in the planar light entering the liquid crystal panel unit 40, and this helps suppress luminance unevenness in the image displayed on the liquid crystal display device. Moreover, in the backlight unit 10, the light emitted from the LEDs 11 is used with high efficiency, and this helps reduce the energy consumption by the liquid crystal display device A.

Although the embodiment described above deals with a liquid crystal display device as an image display device incorporating an illumination device according to the present invention, this is not meant as a limitation. Illumination devices according to the present invention find wide application in transmissive image display devices.

The embodiments by way of which the present invention has been described are in no way meant to limit the present invention, and allow for many modifications and variations within the spirit of the present invention.

INDUSTRIAL APPLICABILITY

Backlight units and liquid crystal display devices according to the present invention find application as a display portion in electronic appliances such as home information appliances, notebook PCs, cellular telephones, game devices, etc.

LIST OF REFERENCE SIGNS 10 backlight unit
11 LED
12 light guide plate
13 light guide body
14 low-refraction layer
140 low-refraction layer
15 prism layer
16 reflective member
20 bright line suppression portion
21 bright line suppression prism
211 inclined face
30 auxiliary prism
311 first auxiliary prism
312 second auxiliary prism
321 first auxiliary prism
322 second auxiliary prism
40 liquid crystal panel unit
41 liquid crystal panel
411 array substrate
412 counter substrate

The invention claimed is:
1. An illumination device comprising:
a plurality of light sources arranged in a row; and
a light guide including:
  a light entry region adjacent to a side face of the light guide through which light from the light sources enters;
  a light exit region abutting the light entry region that allows planar light to emerge from the light exit region;
  a plurality of light entry portions in the light entry region, and facing the plurality of light sources respectively;
  a bright line suppression portion in a front portion of the light entry region between the plurality of light entry portions, and including a bright line suppression prism so shaped as to direct light at an angle from the light sources in a spreading direction closer to optical axes of the light sources,
  a plurality of auxiliary prisms in the front portion of the light entry region that extend in a direction parallel to the optical axes of the light sources and are arranged in a direction of the row of the plurality of light sources such that the plurality of auxiliary prisms diffuse light inside the light entry region in the direction of the row of the plurality of light sources, and
  a plurality of diffusion prisms on a front face of the light guide that extend parallel to the optical axes of the light sources such that the plurality of diffusion prisms diffuse light inside the light guide in the direction of the row of the plurality of light sources, wherein
  the plurality of auxiliary prisms are between the plurality of diffusion prisms,
  the plurality of diffusion prisms are concave and defined by two inclined faces, and
  each of the plurality of auxiliary prisms are in a corresponding one of a plurality of convex light guide prisms between two of the plurality of diffusion prisms.

2. The illumination device according to claim 1, wherein the bright line suppression prism is wider in the direction of the row of the plurality of light sources extending farther away from the light entry portions in an optical axis direction of the light sources.

3. The illumination device according to claim 1, wherein the bright line suppression prism includes a plurality of bright line suppression prisms, and
the plurality of bright line suppression prisms abut one another.

4. The illumination device according to claim 2, wherein the bright line suppression prism includes a plurality of bright line suppression prisms, and
the plurality of bright line suppression prisms abut one another.

5. The illumination device according to claim 4, wherein the bright line suppression portion is, as seen in a plan view, line-symmetric about a line parallel to the optical axes of the light sources, and
the plurality of bright line suppression prisms are inside the bright line suppression portion, and are line-symmetric about a same line as the bright line suppression portion.

6. The illumination device according to claim 3, wherein the bright line suppression portion is, as seen in a plan view, line-symmetric about a line parallel to the optical axes of the light sources, and
the plurality of bright line suppression prisms are inside the bright line suppression portion, and are line-symmetric about a same line as the bright line suppression portion.

7. The illumination device according to claim 5, wherein the bright line suppression portion is trapezoidal.

8. The illumination device according to claim 6, wherein the bright line suppression portion is trapezoidal.

9. The illumination device according to claim 1, wherein the bright line suppression prism is a concave prism with a triangular cross section.

10. The illumination device according to claim 2, wherein the bright line suppression prism is a concave prism with a triangular cross section.

11. The illumination device according to claim 3, wherein the bright line suppression prism is a concave prism with a triangular cross section.

12. An illumination device comprising:
a plurality of light sources arranged in a row; and
a light guide including:
  a light entry region adjacent to a side face of the light guide through which light from the light sources enters;
  a light exit region abutting the light entry region that allows planar light to emerge from the light exit region;
  a plurality of light entry portions in the light entry region, and facing the plurality of light sources respectively;
  a bright line suppression portion in a front portion of the light entry region between the plurality of light entry portions, and including a bright line suppression prism so shaped as to direct light at an angle from the light sources in a spreading direction closer to optical axes of the light sources,
  a plurality of auxiliary prisms in the front portion of the light entry region that extends in a direction parallel to the optical axes of the light sources and are arranged in a direction of the row of the plurality of light sources such that the plurality of auxiliary prisms diffuse light inside the light entry region in the direction of the row of the plurality of light sources, and
  a plurality of diffusion prisms on a front face of the light guide that extend parallel to the optical axes of the light sources such that the plurality of diffusion prisms diffuse light inside the light guide in direction of the row of the plurality of light sources, wherein the auxiliary prisms are between the diffusion prisms, wherein
the plurality of auxiliary prisms includes a first auxiliary prism that abuts the bright line suppression portion and a second auxiliary prism that abuts the light entry portion,
  the plurality of diffusion prisms are concave and defined by two inclined faces, and
  each of the plurality of auxiliary prisms are in a corresponding one of a plurality of convex light guide prisms between two of the plurality of diffusion prisms.

13. The illumination device according to claim 12, wherein the auxiliary prisms are concave prisms with a triangular cross section.

14. The illumination device according to claim 1, wherein the auxiliary prisms are concave prisms with a triangular cross section.

15. A display device comprising:
the illumination device according to claim 1; and
a display panel that receives light from the illumination device.

16. The illumination device according to claim 12, wherein the bright line suppression prism is wider in the direction of the row of the plurality of light sources extending farther away from the light entry portions in an optical axis direction of the light sources.

17. The illumination device according to claim 16, wherein
  the bright line suppression prism includes a plurality of bright line suppression prisms, and
  the plurality of bright line suppression prisms abut one another.

18. The illumination device according to claim 17, wherein
  the bright line suppression portion is, as seen in a plan view, line-symmetric about a line parallel to the optical axes of the light sources, and
  the plurality of bright line suppression prisms are inside the bright line suppression portion, and are line-symmetric about a same line as the bright line suppression portion.

19. The illumination device according to claim 12, wherein the bright line suppression portion is trapezoidal.

20. The illumination device according to claim 12, wherein the bright line suppression prism is a concave prism with a triangular cross section.

* * * * *